United States Patent
Su et al.

(10) Patent No.: US 10,164,728 B2
(45) Date of Patent: *Dec. 25, 2018

(54) METHOD AND APPARATUS FOR GENERIC MAPPING PROCEDURE GMP AND METHOD AND APPARATUS FOR GENERIC MAPPING PROCEDURE GMP DEMAPPING

(71) Applicant: Huawei Technologies Co., Ltd., Shenzhen, Guangdong (CN)

(72) Inventors: Wei Su, Amsterdam (NL); Limin Dong, Shenzhen (CN); Chiwu Ding, Chengdu (CN); Junling Xiang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 271 days.

This patent is subject to a terminal disclaimer.

(21) Appl. No.: 14/686,259

(22) Filed: Apr. 14, 2015

(65) Prior Publication Data

US 2015/0222380 A1    Aug. 6, 2015

Related U.S. Application Data

(63) Continuation of application No. 13/531,037, filed on Jun. 22, 2012, now Pat. No. 9,025,619, which is a
(Continued)

(51) Int. Cl.
*H04J 3/16* (2006.01)
*H04J 3/12* (2006.01)
(Continued)

(52) U.S. Cl.
CPC .............. *H04J 3/1652* (2013.01); *H04J 3/07* (2013.01); *H04J 3/12* (2013.01); *H04L 47/12* (2013.01)

(58) Field of Classification Search
CPC ........ H04J 3/167; H04J 3/1676; H04J 3/1652; H04J 3/12; H04J 3/07
See application file for complete search history.

(56) References Cited

U.S. PATENT DOCUMENTS

2007/0104485 A1    5/2007  Zhang
2007/0189336 A1    8/2007  Zou
(Continued)

FOREIGN PATENT DOCUMENTS

CN    1741429 A    3/2006
CN    1747606 A    3/2006
(Continued)

OTHER PUBLICATIONS

Mark Loyd Jones, et al., "Report of Interim Q11/15 Meeting", Mar. 16-20, 2009, 10 pages.
(Continued)

*Primary Examiner* — Omer S Mian

(57) ABSTRACT

Embodiments of the present invention disclose a method for generic mapping procedure (GMP) mapping, which includes: first the information about a adjusted time slot to be occupied by a second GMP block container is carried in the GMP overhead of a first GMP block container; then, the size of the second GMP block container is adjusted in accordance with the inforamtion; eventually, a client signal is mapped into the adjusted second GMP block container adopting a GMP scheme. This GMP mapping method, when working with a corresponding demapping method, provides lossless mapping and demapping of client signals during the process of bandwidth adjusting.

6 Claims, 12 Drawing Sheets

Related U.S. Application Data continuation of application No. PCT/CN2009/075987, filed on Dec. 24, 2009.

(51) Int. Cl.
  *H04J 3/07* (2006.01)
  *H04L 12/801* (2013.01)

(56) References Cited

U.S. PATENT DOCUMENTS

| | | |
|---|---|---|
| 2007/0248121 A1 | 10/2007 | Zou |
| 2008/0279553 A1 | 11/2008 | Meagher et al. |
| 2009/0208208 A1 | 8/2009 | Chen et al. |
| 2009/0263131 A1 | 10/2009 | Dong |
| 2010/0021173 A1 | 1/2010 | Zhang et al. |
| 2010/0142947 A1 | 6/2010 | Shin et al. |
| 2010/0183301 A1* | 7/2010 | Shin .............. H04J 3/1658 398/45 |
| 2010/0209107 A1 | 8/2010 | Yin |
| 2010/0221005 A1 | 9/2010 | Zhao |
| 2012/0093506 A1 | 4/2012 | Wei et al. |
| 2015/0093113 A1 | 4/2015 | Vissers et al. |

FOREIGN PATENT DOCUMENTS

| | | |
|---|---|---|
| CN | 1770673 A | 5/2006 |
| CN | 1790993 A | 6/2006 |
| CN | 1791057 A | 6/2006 |
| CN | 101030827 A | 9/2007 |
| CN | 101051879 A | 10/2007 |
| CN | 101155016 A | 4/2008 |
| CN | 101242232 A | 8/2008 |
| CN | 101489157 A | 7/2009 |
| CN | 101610430 A | 12/2009 |
| CN | 101834688 A | 9/2010 |
| WO | WO 2006/063529 A1 | 6/2006 |
| WO | WO 2008/101377 A1 | 8/2008 |
| WO | WO 2008/122218 A1 | 10/2008 |

OTHER PUBLICATIONS

"Report of Interim Q11/15 Meeting", Sophia Antipolis, France, May 25-29, 2009, 8 pages.

"Interfaces for the Optical Transport Network (OTN)", Telecommunication Standardization Sector of ITU, G.709/Y.1331, Dec. 22, 2009, 218 pages.

Leon Bruckman, "Bridging between ODU1 and ODU0 based OTN networks", 2009, IP Light, Inc.

* cited by examiner

| Column | 1 — 7 | 8 — 14 | 15 — 16 — 17 | — 3824 | 3825 — 4080 |
|---|---|---|---|---|---|
| Row 1 | FAS frame alignment signal | OTUk OH optical channel transport unit-k overhead | | | FEC forward error correction |
| 2 | | | OPUk OH optical channel payload unit-k overhead | OPUk optical channel payload unit-k | |
| 3 | ODUk OH optical channel data unit-k overhead | | | | |
| 4 | | | | | |

METHOD AND APPARATUS FOR GENERIC MAPPING PROCEDURE GMP AND METHOD AND APPARATUS FOR GENERIC MAPPING PROCEDURE GMP DEMAPPING

CROSS-REFERENCE TO RELATED APPLICATIONS

This application is a continuation of U.S. patent application Ser. No. 13/531,037, filed on Jun. 22, 2012, which is a continuation of International Application No. PCT/CN2009/075987, filed on Dec. 24, 2009. The afore-mentioned patent applications are incorporated herein by reference in their entireties.

TECHNICAL FIELD

The present invention relates to the communications technology field, and in particular, to a method and an apparatus for generic mapping procedure GMP mapping and a method and an apparatus for generic mapping procedure GMP demapping.

BACKGROUND

As a core technology of a next-generation transport network, an OTN (Optical transport network, OTN) includes electrical layer and optical layer technical specifications. The OTN has rich OAM (Operation Administration and Maintenance, operation, administration and maintenance) functions, a powerful TCM (Tandem Connection Monitoring, tandem connection monitoring) capability, and an outband FEC (Forward Error Correction, forward error correction) capability, is capable of implementing flexible scheduling and management of a large-capacity service, and is becoming a main stream technology of a backbone transport network.

On an electrical processing layer, the OTN technology defines a "digital wrapper (Digital Wrapper)" structure with powerful functions to map and wrapper customer service data to facilitate transmission in the OTN and implement management and monitoring on the customer service data. The digital wrapper technology includes technical methods such as: mapping and a multiplexing structure of an optical channel transport unit (OUT, Optical Channel Transport Unit), time division multiplex of an optical channel data unit (ODU, Optical Channel Data Unit), time division multiplex of an optical channel payload unit (OPU, Optical Channel Payload Unit-k Overhead), and mapping of the customer service data.

With the rapid development of data services, more and more customer services need to be transmitted through the OTN. The present OTN mechanism cannot well satisfy and directly bear various services with different rates. In view of this problem, the ITU-T (International Telecommunication Union-Telecommunication Standardization Sector, International Telecommunication Union-Telecommunication Standardization Sector) is discussing on formulating a new optical transport network frame ODUflex frame to solve this problem. The ODUflex still keeps an original ODU structure and is capable of bearing the services and packet services with any constant bit rate (CBR). For different services, different mapping procedures are used to map service signals to the OPU.

The ODUflex cannot be directly sent onto a line and needs to be encapsulated in an HO ODU (Higher Order Optical Channel Data Unit, higher order optical channel data unit) and transmitted through an HO OTU (Higher Order Optical Channel Transport Unit, higher order optical channel transport unit).

At present, a mode of mapping the ODUflex to the HO ODU uses a GMP (Generic Mapping Procedure, generic mapping procedure). The ODUflex occupies several TSs (Time Slots, time slots) of the HO ODU. The GMP is a generic mapping procedure of the OTN and is specifically as follows: Generate a customer entity quantity value Cn and clock information of per service frame period; then, use the sigma-delta algorithm to calculate a distribution pattern of customer data in a payload area; and map Cn records of customer data to corresponding locations of the distribution pattern.

Due to an irregularly change feature of packet service traffic, the ODUflex needs to provide different bandwidths in different periods to satisfy different service traffic and adjust a bandwidth of an ODUflex channel without interrupting the packet service. The adjustment process relates to an adjustment of bandwidth that is occupied when the HO ODU bears the ODUflex, that is, an adjustment of TSs in the HO ODU. A GMP block container is a space that bears the ODUflex and is formed from multiple TSs. Therefore, to adapt to the changes of the packet service traffic, a mechanism is required to adjust a size of the GMP block container.

SUMMARY

Embodiments of the present invention provide a method an apparatus for the generic mapping procedure GMP mapping and a method and an apparatus for generic mapping procedure GMP demapping.

On one aspect, an embodiment of the present invention provides a method for generic mapping procedure GMP mapping. The method includes: first the information about a adjusted time slot to be occupied by a second GMP block container is carried in the GMP overhead of a first GMP block container; then, the size of the second GMP block container is adjusted in accordance with the inforamtion; eventually, a client signal is mapped into the adjusted second GMP block container adopting a GMP scheme.

On another aspect, an embodiment of the present invention provides a method for generic mapping procedure GMP demapping. The method includes: first, information about a time slot TS that needs to be occupied by a second GMP block container subsequent to the first GMP container is obtained, and then according to the information, GMP demapping is performed on the second GMP block container to obtain a client signal from one or more time slots occupied by the second GMP block container, wherein the one or more time slots comprise the TS.

On still another aspect, an embodiment of the present invention provides an apparatus for generic mapping procedure (GMP) mapping. The apparatus includes: a processor and a computer readable medium having a plurality of computer executable instructions stored thereon which, when executed by the processor, cause the processor to implement: carrying, in an GMP overhead (OH) of a first GMP block container, information about a time slot (TS) that needs to be occupied by a second GMP block container subsequent to the first GMP block container, wherein the TS is not occupied by the first GMP block container; adjusting the size of the second GMP block container in accordance with the information; and mapping a client signal into the second GMP block container adopting a GMP scheme.

On the last aspect, an embodiment of the present invention provides an apparatus for generic mapping procedure GMP demapping. The apparatus includes: a processor and a computer readable medium having a plurality of computer executable instructions stored thereon which, when executed by the processor, cause the processor to implement: obtaining from an GMP overhead (OH) of a first GMP block container, information about a time slot TS that needs to be occupied by a second GMP block container subsequent to the first GMP container, wherein the TS is not occupied by the first GMP block container; and performing, according to the information, GMP demapping on the second GMP block container to obtain a client signal from one or more time slots occupied by the second GMP block container, wherein the one or more time slots comprise the TS.

The technical solutions of the embodiments of the present invention provide a mechanism for triggering a TS adjustment. A transmit end adds, in a GMP OH of a GMP block container, information about a TS that needs to be occupied by the GMP block container so that a receive end is capable of adopting a corresponding demapping mode according to changes of the block container. In this way, lossless mapping and demapping processing on a variable block container by adopting the GMP is implemented.

BRIEF DESCRIPTION OF THE DRAWINGS

To make the technical solutions in the embodiments of the present invention or in the prior art clearer, the following briefly describes the accompanying drawings involved in the description about the embodiments or the prior art. Apparently, the accompanying drawings described below are merely some embodiments of the present invention, and a person skilled in the art can derive other accompanying drawings from these accompanying drawings without any creative effort.

FIG. 1 is a structural diagram of an OTN frame according to an embodiment of the present invention;

FIG. 1a is an example diagram of TS distribution according to an embodiment of the present invention;

DETAILED DESCRIPTION

Figure 2:
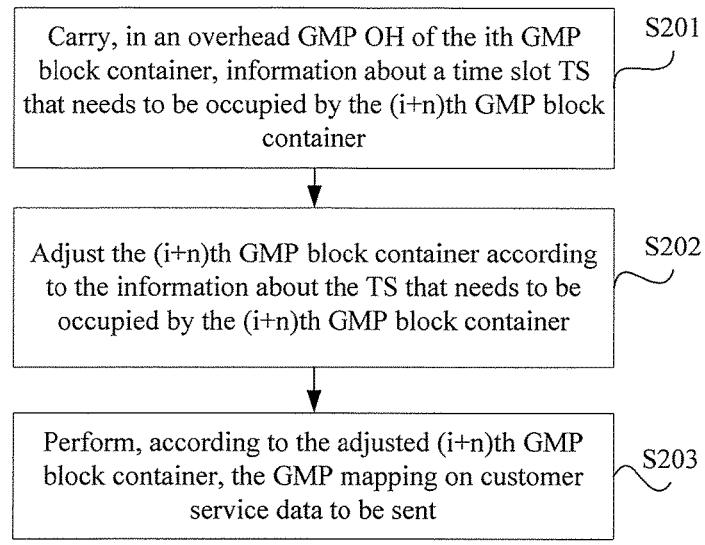
FIG. 2 is a flow chart of a general method according to Embodiment 1 of the present invention.

To meet a requirement of an ODUflex bandwidth adjustment and achieve a lossless TS adjustment, embodiments of the present invention provide a TS adjustment mechanism and a method and an apparatus for implementing GMP adaptive processing during the TS adjustment. To achieve the lossless TS adjustment, a transmit end includes, in a GMP overhead, TS information (which is represented as information M in the embodiments) used to indicate the TS adjustment so as to correlate the TS adjustment with GMP mapping and demapping processing. A receive end perceives a TS change of a GMP block container on the transmit end according to content of the information M and performs lossless demapping processing according to the adjusted GMP block container.

To make the objectives, technical solutions, and merits of the embodiments of the present invention clearer, the following clearly and completely describes the technical solutions in the embodiments of the present invention with reference to the accompanying drawings in the embodiments of the present invention. Obviously, the described embodiments are only a part of the embodiments of the present invention rather than all the embodiments. All other embodiments obtained by a person skilled in the art based on the embodiments in the present invention without creative efforts shall fall within the protection scope of the present invention.

Embodiment 1

Figure 1A:
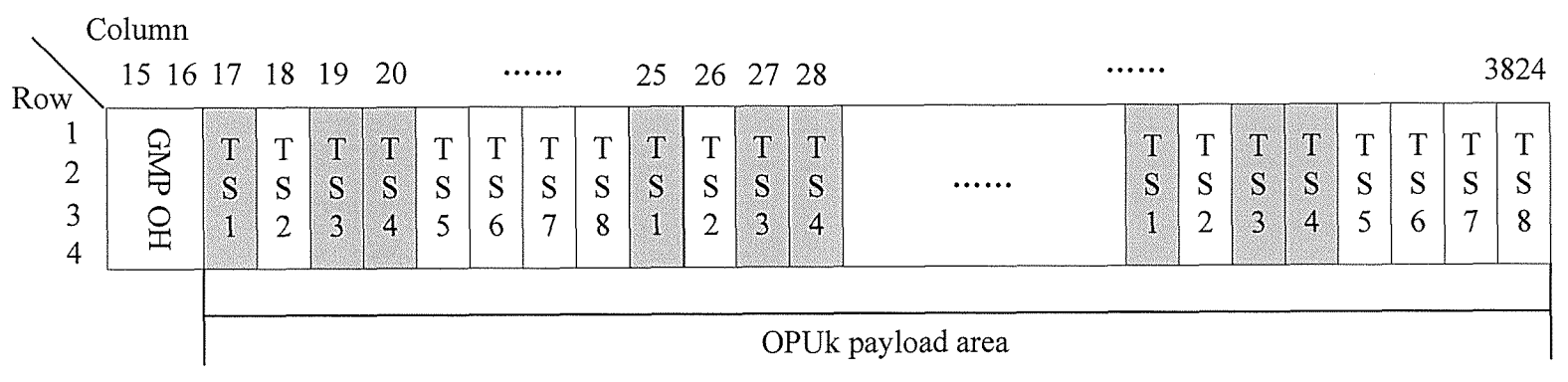

FIG. 1 is a diagram of a format of an OTN frame according to the present embodiment. As shown in FIG. 1, the OTN frame is a standard modular structure with 4080 columns×4 rows. The 16 columns in a header of the OTN frame are overhead bytes, 3808 columns in the middle are payloads, and 256 columns in the tail are FEC check bytes. The OTN frame includes: FAS (Frame Alignment Signal, frame alignment signal) bytes that are located in row 1 and columns 1-7 and used to provide a function of frame synchronization location, where the seventh byte of the FAS is a multiframe indication (Multi-Frame Alignment Signal, MFAS) that is used to indicate overhead distribution when data of multiple customer services is borne in a time division multiplexing mode; OTUk OH (Optical Channel Transport Unit-k Overhead, optical channel transport unit-k overhead) bytes that are located in row and columns 8-14 and used to provide a network management function at an optical channel transport unit level; ODUk OH (Optical Channel Data Unit-k Overhead, optical channel data unit-k overhead) bytes that are located in rows 24 and columns 114 and used to provide maintenance and operation functions; OPUk OH (Optical Channel Payload Unit-k Overhead, optical channel payload unit-k overhead) bytes that are located in columns 15-16 and used to provide a customer service data adaptation function, where the OPUk OH bytes include a payload structure identifier (Payload Structure Identifier, PSI), the PSI corresponds to 0-255 possible values under the MFAS indication, byte 0 is a customer service data type indication (Payload Type, PT), and other bytes are reserved (Reserved, RES) for future expansion; OPUk (Optical Channel Payload Unit-k, optical channel payload unit-k) bytes that are located in columns 17-3824 and used to provide a customer service data bearing function, where customer service data to be transmitted is encapsulated into the OPUk; and FEC bytes that are located in columns 3825-4080 and used to provide error detection and correction functions.

The coefficient k indicates a supported bit rate. Different bit rates correspond to different types of OPUk, ODUk, and OTUk. When k is 0, it indicates that the bit rate is 1.25 Gbit/s; when k is 1, it indicates that the bit rate is 2.5 Gbit/s; when k is 2, it indicates that the bit rate is 10 Gbit/s; when k is 3, it indicates that the bit rate is 100 Gbit/s. The OPUk bytes and the OPUk OH bytes form an OPUk frame; the OPUk frame, the ODUk OH bytes, and the FAS bytes form an ODUk frame; and the ODUk frame, the OTUk OH bytes, and the FEC bytes form an OTUk frame.

A mapping procedure refers to a method of mapping different types of services to be sent into an OPU payload area (Payload Area). The present embodiment uses a GMP mapping procedure to map the customer service data into the OPU. FIG. 1*a* is an example diagram of TS distribution using GMP mapping according to the present embodiment. As shown in FIG. 1*a*, a GMP OH in FIG. 1*a* is equivalent to the OPUk OH in FIG. 1. The GMP OH in this embodiment includes TS information used to indicate a TS adjustment. One or more TSs in FIG. 1*a* form a GMP block container to transmit the customer service data.

FIG. 1*a* uses OPU2 to describe a specific GMP mapping method. The payload area of the OPU2 frame is divided into 8 TSs, where four rows of a column form a time slot and the TSs are identified as TS1, TS2, TS3, and till TS8. The TSs are identified in this manner in cyclic until the TSs of all columns in the payload area are allocated. Eight OPU2 frames form an OPU2 8-multiframe. The customer service data can be mapped into one or more time slots in a payload area of the OPU2 8-multiframe. One or more TSs in the OPU2 8-multiframe may form a GMP block container to bear the service data. Here, three TSs, namely, TS1, TS3, and TS4, are used to transmit the service data.

The customer service data is placed into the GMP block container in a unit of row. When time slots in a row are full, a similar placing operation is conducted in corresponding time slots in the next row. As shown in FIG. 1*a*, the GMP block container occupies three TSs and a mapping granularity is 3-byte (byte). When the customer data is placed into the GMP block container, 3 bytes of customer data are placed into the first row in column 17, column 19, and column 20 respectively in a clock period (determined by clock information during the mapping) and another 3 bytes of customer data are placed to the first row in column 25, column 27, and column 28 respectively in the second clock period. The rest can be deduced by analogy. After a row is full, a similar placing operation is conducted in the next row.

Embodiment 1 of the present invention provides a method for generic mapping procedure GMP mapping. This method may be based on the frame structure in FIG. 1. The mapping method is a processing method on a transmit end.

FIG. 2 is a flow chart of a general method according to Embodiment 1 of the present invention. As shown in FIG. 2, the method includes:

S201. Carry, in an overhead GMP OH of the ith GMP block container, information about a time slot TS that needs to be occupied by the (i+n)th GMP block container.

S202. Adjust the (i+n)th GMP block container according to the information about the TS that needs to be occupied by the (i+n)th GMP block container.

S203. Perform, according to the adjusted (i+n)th GMP block container, the GMP mapping on customer service data to be transmitted.

In the present embodiment, the TS may be adjusted when the transmit end receives an external TS adjustment instruction or a triggering command.

To facilitate description, this embodiment takes n=1 as an example to describe a principle of the GMP mapping in detail. Assume that a size of the (i+1)th GMP block container is changed, information about a TS that needs to be occupied by the changed (i+1)th GMP block container is able to be obtained from the TS information carried in the GMP OH of the ith block container. A change of a next GMP block container is notified in advance in a previous GMP block container. Therefore, a receive end is capable of adaptively adjusting a demapping mode to achieve lossless data. A specific implementation manner on the receive end is described in detail in subsequent embodiments.

The TS information in the present embodiment includes TS quantity information, where the TS quantity information is associated with the mapping granularity. That is, the TS quantity is consistent with the mapping granularity, and the TS quantity and the mapping granularity are adjusted simultaneously. Alternatively, the TS information may also include the TS quantity information and mapping granularity information, where the TS quantity and the mapping granularity are adjusted separately. In this embodiment, a specific TS distribution condition, that is, which TSs transmit the customer service data, is indicated in the PSI of the OTN frame.

1. The TS quantity and the mapping granularity are adjusted simultaneously. For this condition, the TS information includes the TS quantity information. Optionally, the TS quantity information may be represented as a change indication of the TS quantity.

For this condition, step S202 and step S203, may specifically include: simultaneously adjusting the size and mapping granularity of the (i+1)th GMP block container according to the TS quantity; performing, according to the adjusted size and mapping granularity of the (i+1)th GMP block container, the GMP mapping on the customer service data to be transmitted.

2. The TS quantity and the mapping granularity are adjusted separately. For this condition, the TS information includes the TS quantity and the mapping granularity. The TS quantity may be adjusted first and then the mapping granularity is adjusted; or, the mapping granularity is adjusted first and then the TS quantity is adjusted, so that the TS quantity and the mapping granularity are consistent finally.

When the TS quantity is adjusted, the TS quantity of the (i+1)th GMP block container is carried in the overhead GMP OH of the ith GMP block container, where the TS quantity needs to be adjusted. Step S202 and step 203 include: adjusting the size of the (i+1)th GMP block container according to the TS quantity; and performing, according to the adjusted size of the (i+1)th GMP block container and the mapping granularity of the ith GMP block container, the GMP mapping on the customer service data to be transmitted.

When the mapping granularity is adjusted after the TS quantity is adjusted, after step S202 and step 203, the method further includes: carrying a mapping granularity of the (j+m)th GMP block container in an overhead GMP OH of the jth GMP block container, where the mapping granularity needs to be adjusted; adjusting the mapping granularity of the (j+m)th GMP block container according to the carried mapping granularity; and performing, according to the size of the jth GMP block container and the mapping granularity of the (j+m)th GMP block container, the GMP mapping on the customer service data to be transmitted. To facilitate description, this embodiment takes m=1 as an example to describe the principle of the GMP mapping.

In the present embodiment, optionally, when a bandwidth is to be increased, perform the TS adjustment first and then change the mapping granularity; when a reducing adjustment is performed on the TSs, that is, a reducing adjustment is performed on the TSs, change the mapping granularity first and then perform the TS adjustment. This embodiment of the present invention is not restricted herein and the adjustment may be performed in a reverse order according to the preceding manner. Regardless of whether the adjustments are performed simultaneously or separately, a final objective is to adjust the TS quantity and an M-byte to be consistent. For example, originally, there are 3 TSs and the mapping granularity is 3-byte; if the TSs are increased by 1, regardless of whether the adjustments are performed simultaneously or separately, a final result should be that there are 4 TSs and the mapping granularity is 4-byte.

The following describes an encapsulation mode of the information about the TS (information M for short) that needs to be occupied by the GMP block container in step S201 of Embodiment 1 of the present invention.

Figure 3:
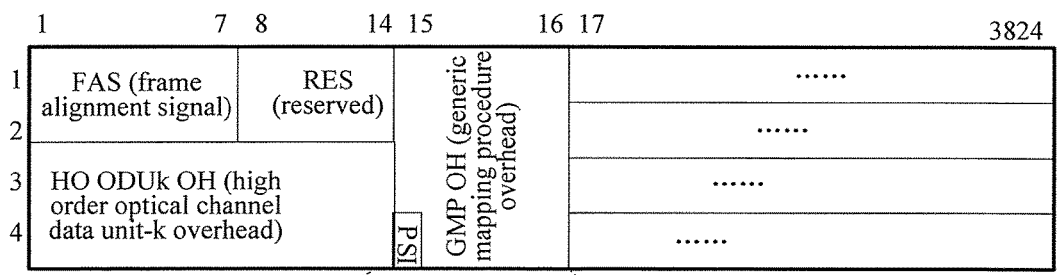
FIG. 3 is a first schematic diagram of an encapsulation mode of information M according to Embodiment 1 of the present invention.
Figure 3:
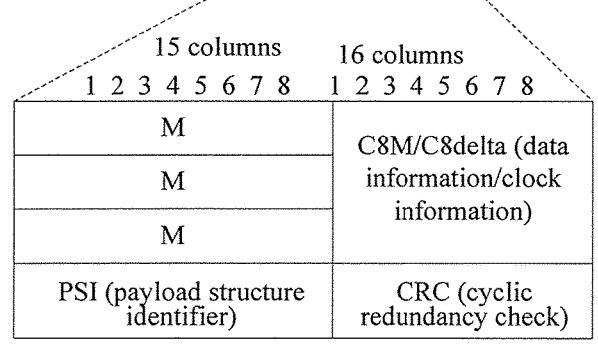

FIG. 3 is a schematic diagram of an encapsulation mode of information M according to this embodiment of the present invention. This figure is applicable to a condition in which the TS quantity and a mapping granularity are adjusted simultaneously. As shown in FIG. 3, three same pieces of information M are placed in rows 1-3 of column 15 in the generic mapping procedure overhead GMP OH. The information M refers to the TS quantity information, ranging from 1 to 80. Specifically, in a byte in row 1 and column 15, bit 1 to bit 8 may all be used to place the information M, that is, the quantity information of the TSs occupied by the GMP block container. Similarly, the same TS quantity information as that in row 1 and column 15 are placed in respective 8 bits in row 2 and column 15 and in row 3 and column 15. When the TS adjustment needs to be performed, the information M is directly changed to a value corresponding to the adjusted TSs so that the next GMP block container is adjusted to be of a size indicated by the changed information M.

Assume that the current GMP block container occupies three TSs and the next GMP block container needs to occupy four TSs. Uniformly change the values of the three pieces of information M in the GMP OH of the current GMP block container to 4 in a binary format so as to trigger that the size of the next GMP block container is adjusted to occupy 4 TSs. An objective of placing the three same pieces of information M is to ensure accuracy and prevent an error introduced during transmission. The receive end may obtain the information M through a majority decision. For example, when the three pieces of information M are consistent, it is indicated that the transmission is correct and any piece of information M is selected to indicate the quantity of the TSs occupied by the GMP block container. When two pieces among the three pieces of information M are consistent and another piece of information M is different, any one of the two pieces of information M that are consistent with each other is selected to indicate the quantity of the TSs occupied by the GMP block container. When all the three pieces of information M are different, it is indicated that the transmission is faulty and the quantity of the TSs occupied by the GMP block container remains unchanged.

In the present embodiment, when the TS quantity information and the mapping granularity information are adjusted simultaneously, in the preceding encapsulation mode, the information M is not only the TS quantity information but also the mapping granularity information M-bytes. A concept of the mapping granularity refers to the number of bytes used as a unit to map the customer data to be transmitted to the OPUk. If the mapping granularity is 1, the customer data to be transmitted is placed into the OPUk one byte by one byte. If the mapping granularity is 3-byte, the customer data to be transmitted is placed into the OPUk in a unit of 3 bytes. In this case, when the TS quantity is changed, the mapping granularity is also changed accordingly. The encapsulation mode in FIG. 3 is applicable to the condition in which the GMP block container and the mapping granularity are changed simultaneously.

But a person skilled in the art should understand that the information M is not limited to include only the TS quantity information or the mapping granularity information. In another specific application, current TS status information or information about an interaction between a source end and a sink end may further be included. Moreover, the placing position and the encryption mode of the information M in this embodiment of the present invention are not limited to the preceding described modes. That is, the overhead indication that triggers the TS adjustment is not limited to a change of the information M and may be specified to be an overhead indication that is specially formulated for triggering the TS adjustment.

Figure 4:
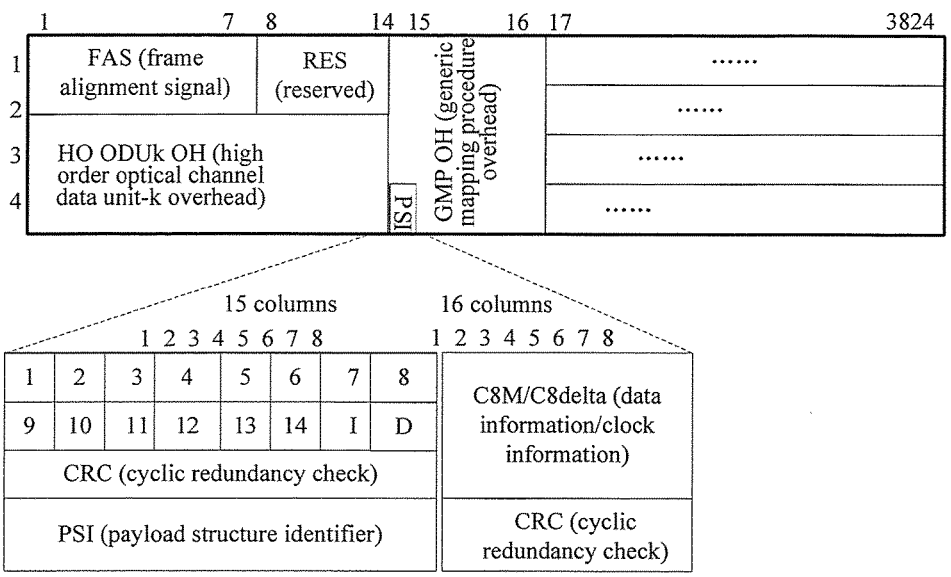
FIG. 4 is a second schematic diagram of an encapsulation mode of information M according to Embodiment 1 of the present invention.

FIG. 4 is a schematic diagram of another encapsulation mode of information M according to this embodiment of the present invention. This figure is not only applicable to the condition in which the TS quantity and the mapping granularity are adjusted simultaneously but also applicable to a condition in which the TS quantity and the mapping granularity are adjusted separately. To make the description uniform, the subsequent embodiments describe various encapsulation methods in the present invention in detail with reference to FIG. 4 and specific tables.

In the following Table 1 to Table 6, the encapsulation mode of the information M is applicable to the condition in which the TS quantity and the mapping granularity are changed simultaneously. The TS quantity information is also the mapping granularity information. When the TS quantity is changed, the mapping granularity is also changed accordingly. For example, when it is indicated that the TS quantity is increased by 1, it is also indicated that the mapping granularity is increased by 1. Table 1 to Table 6 describe 6 states corresponding to changes of the information M, that is, states that the information M remains unchanged, is increased by 1, is decreased by 1, is increased by 2, is decreased by 2, and is increased or decreased by a value greater than 2.

TABLE 1

| Information M change indication table | | | | | | | | | | | | | | | |
| --- | --- | --- | --- | --- | --- | --- | --- | --- | --- | --- | --- | --- | --- | --- | --- |
| 1 | 2 | 3 | 4 | 5 | 6 | 7 | 8 | 9 | 10 | 11 | 12 | 13 | 14 | I | D |
| U | U | U | U | U | U | U | U | U | U | U | U | U | U | 0 | 0 |

As shown in Table 1, 16 bits in rows 1-2 and column 15 in FIG. 4 are expanded to form Table 1. Bit 1 to bit 14 in rows 1-2 and column 15 in FIG. 4 correspond to bit 1 to bit 14 in Table 1, which are all used to store the information M, where "U" indicates data and a value is 0 or 1. Bit 15 to bit 16 correspond to bit 15 to bit 16 in Table 1, where the letter I indicates an increasing indication while the letter D indicates a decreasing indication. When I/D=00, it is indicated that the TS quantity remains unchanged. In this case, "U" in bit 1 to bit 14 indicates the actual quantity of TSs.

TABLE 2

| Information M change indication table | | | | | | | | | | | | | | | |
| --- | --- | --- | --- | --- | --- | --- | --- | --- | --- | --- | --- | --- | --- | --- | --- |
| 1 | 2 | 3 | 4 | 5 | 6 | 7 | 8 | 9 | 10 | 11 | 12 | 13 | 14 | I | D |
| I | U | I | U | I | U | I | U | I | U | I | U | I | U | 1 | 0 |

As shown in Table 2, "U" indicates the data and "I" indicates that the bit is reversed. In Table 2, odd bits among bit 1 to bit 14 are reversed based on Table 1. That is, bit 1, bit 3, bit 5, bit 7, bit 9, bit 11, and bit 13 are reversed. In addition, I/D=10, which indicates that the information M is changed and specifically indicates that the TS quantity is increased by 1 in the next GMP block container.

TABLE 3

| Information M change indication table | | | | | | | | | | | | | | | |
| --- | --- | --- | --- | --- | --- | --- | --- | --- | --- | --- | --- | --- | --- | --- | --- |
| 1 | 2 | 3 | 4 | 5 | 6 | 7 | 8 | 9 | 10 | 11 | 12 | 13 | 14 | I | D |
| U | I | U | I | U | I | U | I | U | I | U | I | U | I | 0 | 1 |

In Table 3, when even bits among bit 1 to 14 are reversed based on Table 1, that is, bit 2, bit 4, bit 6, bit 8, bit 10, bit 12, and bit 14 are reversed, and I/D=01, it is indicated that the TS quantity is decreased by 1 in the next GMP block container.

TABLE 4

| Information M change indication table | | | | | | | | | | | | | | | |
| --- | --- | --- | --- | --- | --- | --- | --- | --- | --- | --- | --- | --- | --- | --- | --- |
| 1 | 2 | 3 | 4 | 5 | 6 | 7 | 8 | 9 | 10 | 11 | 12 | 13 | 14 | I | D |
| U | I | I | U | U | I | I | U | U | I | I | U | U | I | 1 | 0 |

As shown in Table 4, when bit 2, bit 3, bit 6, bit 7, bit 10, bit 11, and bit 14 are reversed based on Table 1 and I/D=10, it is indicated that the TS quantity needs to be increased by 2 in the next GMP block container.

TABLE 5

| Information M change indication table | | | | | | | | | | | | | | | |
| --- | --- | --- | --- | --- | --- | --- | --- | --- | --- | --- | --- | --- | --- | --- | --- |
| 1 | 2 | 3 | 4 | 5 | 6 | 7 | 8 | 9 | 10 | 11 | 12 | 13 | 14 | I | D |
| I | U | U | I | I | U | U | I | I | U | U | I | I | U | 0 | 1 |

As shown in Table 5, when bit 1, bit 4, bit 5, bit 8, bit 9, bit 12, and bit 13 are reversed based on Table 1 and I/D=01, it is indicated that the TS quantity needs to be decreased by 2 in the next GMP block container.

TABLE 6

Information M change indication table

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| | | | | Binary value binary value | | | | | | | | | | 1 | 1 |

As shown in Table 6, when I/D=11, it is indicated that the increasing or decreasing amplitude of the TS quantity value is greater than 2. In this case, directly enter a binary value in bit 1 to bit 14 to indicate the TS quantity value after a large-amplitude adjustment is made. For example, the original quantity of the TSs occupied by the GMP block container is 30; at present, the size of the block container needs to be adjusted to occupy 35 TSs; because the TS change amplitude is greater than 2, the I/D is set to 11 and the information M in bit 1 to bit 14 is changed to a binary value of 35.

The preceding is merely an exemplary implementation mode. Various change conditions of the TS quantity may also be indicated by using another bit reversal rule together with different I/D values, which is not restricted in this embodiment of the present invention.

In the present embodiment, when the TS quantity information and the mapping granularity information are adjusted separately, the encapsulation mode shown in FIG. 4 may be modified so that both the TS quantity information M and the mapping granularity information M' are included in the GMP OH. A 14-bit space may house two times information M. Therefore, it may be considered to save the capacity, that is, the capacity for placing the information M is reduced to 7 bits and the other 7 bits are used to place the information M'. As shown in FIG. 4, bit 1 to bit 7 in rows 1-2 of column 15 of the GMP OH are used to store the information M, where the information M is the TS quantity information ranging from 1 to 80; bit 8 to bit 14 are used to store the information M', where the information M' is the mapping granularity information ranging from 1 to 80. The I/D is an increasing or decreasing indication, where the value is 0 or 1 and is shared by the information M and information M'.

Table 7 to Table 17 are separate change indication tables of the information M (TS quantity) and the information M' (mapping granularity). As shown in Table 7 to Table 17, this encapsulation mode is applicable to the condition in which the GMP block container and the mapping granularity are changed separately. That is, when the TS quantity is changed, the mapping granularity remains unchanged; when the mapping granularity is changed, the TS quantity remains unchanged. The present embodiment uses the values of the information M, information M', and I/D to indicate the change conditions of the TS quantity and mapping granularity.

TABLE 7

Indication table for unchanged information M and information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | U | U | U | U | U | U | U | U | U  | U  | U  | U  | U  | 0 | 0 |

As shown in Table 7, when I/D=00, it is indicated that the TS quantity information and the mapping granularity information remain unchanged.

TABLE 8

Indication table for changed information M and unchanged information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| I | U | I | U | I | U | I | U | U | U  | U  | U  | U  | U  | 1 | 0 |

As shown in Table 8, when any one of the TS quantity and the mapping granularity is changed, the other one remains unchanged. For example, when the TS quantity is changed, the I/D is set to 10 and odd bits among bit 1 to bit 7, that is, bit 1, bit 3, bit 5, and bit 7 are reversed based on Table 7, indicating that the TS quantity is increased by 1 in the next GMP block container. Data in bit 8 and bit 14 is unchanged, indicating that the mapping granularity remains unchanged.

TABLE 9

Indication table for changed information M and unchanged information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | I | U | I | U | I | U | U | U | U  | U  | U  | U  | U  | 0 | 1 |

As shown in Table 9, when even bits among bit 1 to bit 7 are reversed based on Table 7, the I/D is set to 01, and the data in bit 8 to bit 14 is unchanged, it is indicated that the TS quantity needs to be decreased by 1 in the next GMP block container while the mapping granularity remains unchanged.

TABLE 10

Indication table for changed information M and unchanged information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | I | I | U | U | I | I | U | U | U  | U  | U  | U  | U  | 1 | 0 |

As shown in Table 10, when bit 2, bit 3, bit 6, and bit 7 among bit 1 to bit 7 are reversed based on Table 7, the I/D is set to 10, and the data in bit 8 to bit 14 is unchanged, it is indicated that the TS quantity needs to be increased by 2 in the next GMP block container while the mapping granularity remains unchanged.

TABLE 11

Indication table for changed information M and unchanged information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| I | U | U | I | I | U | U | U | U | U  | U  | U  | U  | U  | 0 | 1 |

As shown in Table 11, when bit 1, bit 4, and bit 5 among bit 1 to bit 7 are reversed based on Table 7, the I/D is set to 01, and the data in bit 8 to bit 14 is unchanged, it is indicated that the TS quantity needs to be decreased by 2 in the next GMP block container while the mapping granularity remains unchanged.

TABLE 12

Indication table for changed information M and unchanged information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| Binary value binary value | | | | | | | U | U | U | U | U | U | U | 1 | 1 |

As shown in Table 12, when the increasing or decreasing amplitude of the TS quantity is greater than 2, a binary value is directly entered in bit 1 to bit 7, indicating the TS quantity value after the large-amplitude adjustment is made, that is, indicating that the TS quantity is changed to a value represented by the binary value in the next GMP block container. Because the data in bit 8 to bit 14 is unchanged, the mapping granularity remains unchanged.

TABLE 13

Indication table for unchanged information M and changed information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | U | U | U | U | U | U | I | U | I  | U  | I  | U  | I  | 1 | 0 |

As shown in Table 13, when the mapping granularity is changed, the TS quantity remains unchanged. For example, the I/D is set to 10, even bits among bit 8 to bit 14 are reversed based on Table 7, and data in bit 1 to bit 7 is unchanged so as to indicate that the mapping granularity needs to be increased by 1 in the next GMP block container while the TS quantity remains unchanged.

TABLE 14

Indication table for unchanged information M and changed information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | U | U | U | U | U | U | U | I | U  | I  | U  | I  | U  | 0 | 1 |

As shown in Table 14, the I/D is set to 01, odd bits among bit 8 to bit 14 are reversed based on Table 7, and the data in bit 1 to bit 7 is unchanged so as to indicate that the mapping granularity needs to be decreased by 1 in the next GMP block container while the TS quantity remains unchanged.

TABLE 15

Indication table for unchanged information M and changed information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | U | U | U | U | U | U | U | I | I  | U  | U  | I  | I  | 1 | 0 |

As shown in Table 15, the I/D is set to 10, bit 9, bit 10, bit 13, and bit 14 among bit 8 to 14 are reversed based on Table 7, and the data in bit 1 to bit 7 is unchanged so as to indicate that the mapping granularity needs to be increased by 2 in the next GMP block container while the TS quantity remains unchanged.

TABLE 16

Indication table for unchanged information M and changed information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | U | U | U | U | U | U | I | U | U  | I  | I  | U  | U  | 0 | 1 |

As shown in Table 16, the I/D is set to 01, bit 8, bit 11, and bit 12 among bit 8 to bit 14 are reversed based on Table 7, and the data in bit 1 to bit 7 is unchanged so as to indicate that the mapping granularity needs to be decreased by 2 in the next GMP block container while the TS quantity remains unchanged.

TABLE 17

Indication table for unchanged information M and changed information M'

| 1 | 2 | 3 | 4 | 5 | 6 | 7 | 8 | 9 | 10 | 11 | 12 | 13 | 14 | I | D |
|---|---|---|---|---|---|---|---|---|----|----|----|----|----|---|---|
| U | U | U | U | U | U | U | Binary value | | | | | binary value | | 1 | 1 |

As shown in Table 17, when the increasing or decreasing amplitude of the mapping granularity is greater than 2, a binary value is directly entered in bit 8 to bit 14, indicating a mapping granularity after the large-amplitude adjustment is made, that is, indicating that the mapping granularity is changed to the value represented by the binary value in the next GMP block container. Because the data in bits 1 to bit 7 is unchanged, the TS quantity remains unchanged.

The preceding specific encapsulation mode is used for only describing this embodiment of the present invention. The placing position and encapsulation mode of the information M or information M' in Embodiment 1 of the present invention are not limited to the preceding described modes.

Figure 5:
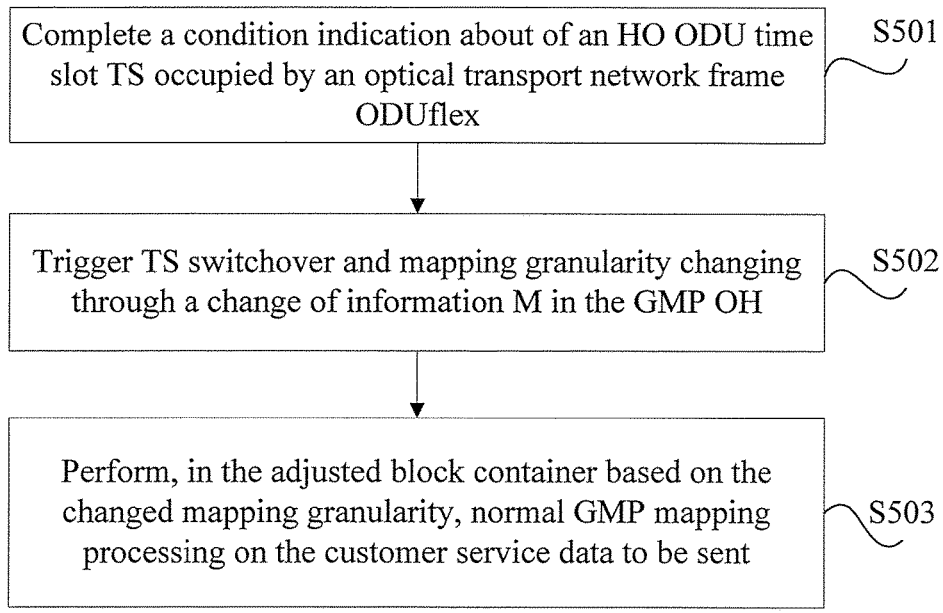
FIG. 5 is a first flow chart of a specific method according to Embodiment 1 of the present invention.

FIG. 5 is a first flow chart of a specific method according to Embodiment 1 of the present invention. An execution body of this method is a transmit end. FIG. 5 describes a condition in which a GMP block container and a mapping granularity are changed simultaneously. As shown in FIG. 5, the method includes:

S501. Use a PSI [0-255] of a 256-multiframe of an HO ODU to complete a condition indication of an HO ODU TS occupied by an optical transport network frame ODUflex.

Specifically, the TS condition indication indicates the TSs that form the ODUflex (that is, a specific TS distribution condition).

S502. After the TS condition indication is complete, trigger operations of TS switchover and mapping granularity changing through a change of information M in a GMP OH, where the information M is condition information about the TSs occupied by the GMP block container, which includes at least quantity information of the TSs occupied by the GMP block container and may further include, for example, a current TS status information or information about an interaction between a source end and a sink end.

Optionally, the specific process of S502 may include:

Modify information M in a GMP OH of the ith GMP block container, where i is a positive integer and is equal to or greater than 1, and may be flexibly controlled according to an adjustment requirement after the TS condition indication is complete, that is, the information M in the GMP OH of the first, the second . . . or the ith GMP block container may be modified after the TS condition indication is complete; if the GMP uses a mapping granularity that associates with the TS quantity to perform mapping, the information M is also mapping granularity information M-byte. Modify the information M in the GMP OH of the ith GMP block container to indicate that a container adjustment and mapping granularity changing are performed in the next (the (i+1)th) GMP block container, where the size of the ith GMP block container remains the quantity of the originally occupied TSs and the original mapping granularity is still used, in the ith GMP block container, to perform mapping processing on customer service data.

The TS switchover and the mapping granularity changing are completed in the next (the (i+1)th) GMP block container. A condition about an adjustment that needs to be performed in the (i+1)th GMP block container may be obtained according to the information M in the GMP OH of the previous (the ith) GMP block container. The size of the (i+1)th GMP block container is adjusted to a size specified by the changed information M in the GMP OH of the ith GMP block container. If the GMP uses the mapping granularity that associates with the TS quantity to perform the mapping, the information M is also the mapping granularity information M-byte. In this case, the (i+1)th GMP block container also uses the mapping granularity specified by the changed information M in the GMP OH of the ith GMP.

S503. After the TS adjustment and the mapping granularity changing are completed, in the (i+1)th GMP block container, perform mapping processing on the customer service data to be sent according to the adjusted container size and the changed mapping granularity, that is, place the customer service data into the adjusted GMP block container in the changed mapping granularity by using the GMP mapping processing method. In a subsequent GMP block container, perform normal GMP mapping processing on the customer service data to be sent in the adjusted block container according to the changed mapping granularity.

Figure 6:
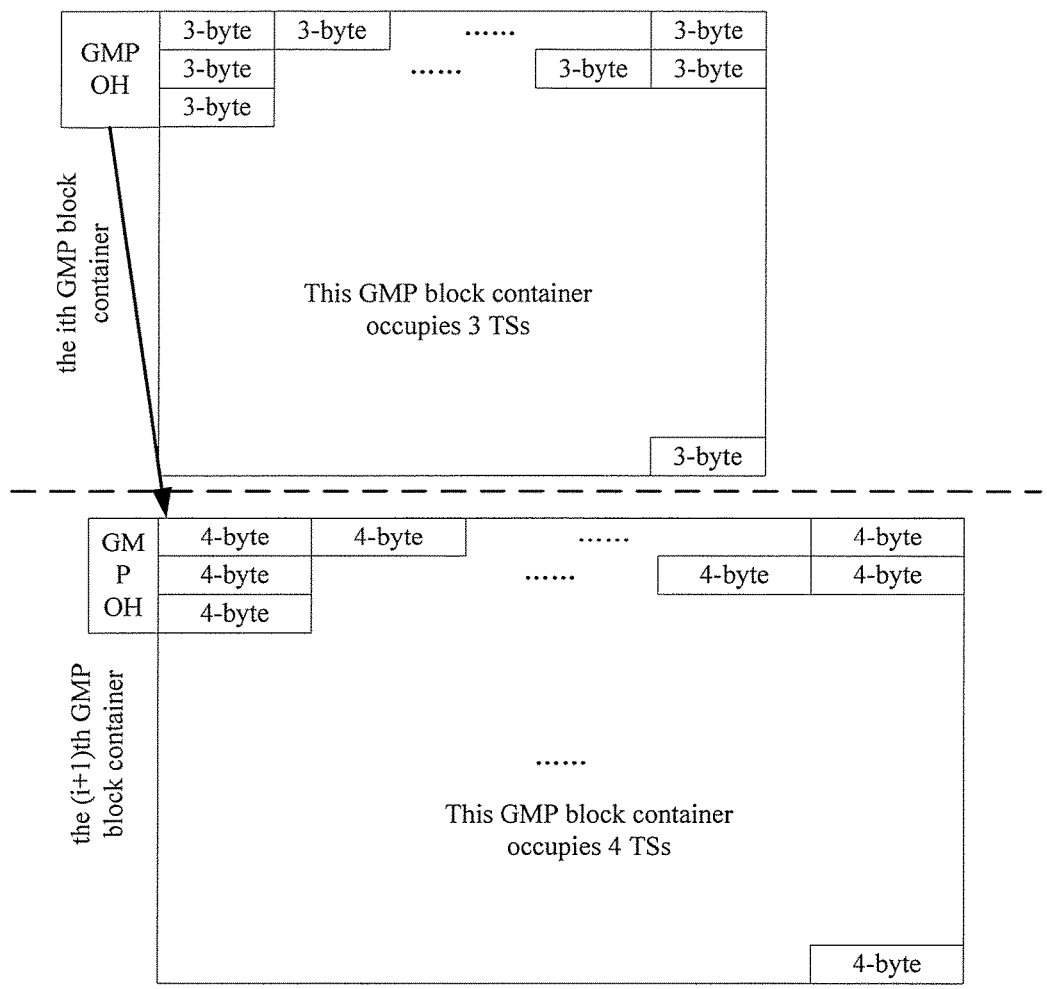
FIG. 6 is an example diagram of performing GMP mapping based on the method in FIG. 5 according to an embodiment of the present invention.

FIG. 6 is an example diagram of performing GMP mapping according to the method in FIG. 5. As shown in FIG. 6, the ith GMP block container occupies three TSs and the customer service data is mapped into the GMP block container based on a 3-byte mapping granularity; the size of the (i+1)th GMP block container is adjusted to four TSs and the customer service data is mapped into the GMP block container based on a 4-byte mapping granularity.

Figure 7:
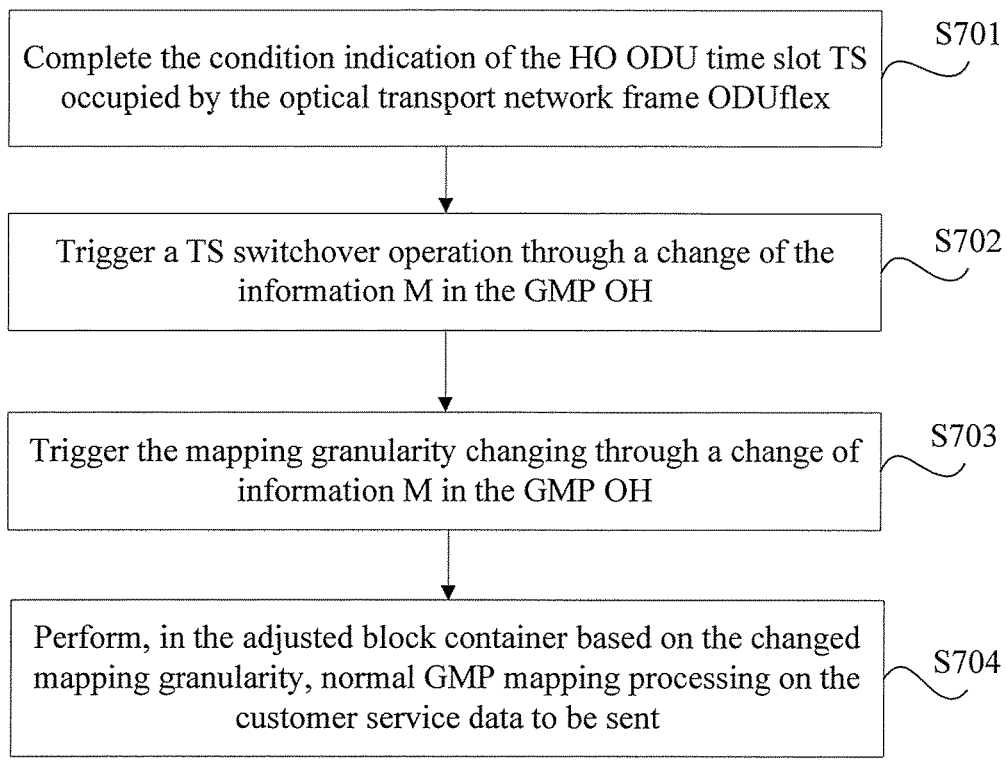
FIG. 7 is a second flow chart of a specific method according to Embodiment 1 of the present invention.

FIG. 7 is a second flow chart of a specific method according to Embodiment 1 of the present invention. An execution body of this method is a transmit end. FIG. 7 describes a condition in which a GMP block container and a mapping granularity are changed separately. As shown in FIG. 7, the method includes:

S701. Use a PSI [0-255] of a 256-multiframe of an HO ODU to complete condition indication of an HO ODUTS occupied by an ODUflex.

S702. After the TS condition indication is complete, perform the TS switchover operation through a change of information M in a GMP OH and use the switched TS to perform GMP mapping.

Optionally, the specific process of S702 may include:

Modify information M in a GMP OH of the ith GMP block container to indicate that a container adjustment is performed in the next (the (i+1)th) GMP block container, where i is a positive integer and this step may be flexibly controlled according to an adjustment requirement after the TS indication is completed, that is, the information M in the GMP OH of the first, the second . . . and the ith GMP block container may be modified after the TS condition indication is completed. The information M is information about the TSs occupied by the GMP block container, which includes at least the TS quantity information. The size of the ith GMP block container remains the quantity of the originally occupied TSs and the original mapping granularity is still used, in the ith GMP block container, to perform mapping processing on customer service data.

The TS switchover is completed in the (i+1)th GMP block container. A condition of an adjustment in the (i+1)th GMP block container may be known according to the information M in the GMP OH of the previous (the ith) GMP block container. The (i+1)th GMP block container is adjusted to be of a size specified by the information M. The mapping granularity used to perform the mapping processing in the (i+1)th GMP block container remains unchanged.

S703. Trigger an operation of mapping granularity changing through a change of information M' in the GMP OH.

Optionally, the specific process of S703 may include:

Modify information M' in a GMP OH of the jth GMP block container, where j is a positive integer. When the TS quantity is adjusted first and then the mapping granularity is adjusted, j is greater than i+1. In the present embodiment, however, the mapping granularity may also be adjusted first and then the TS quantity is adjusted. Therefore, the present embodiment does not restrict a relationship between i and j.

In this case, the information M' is GMP mapping granularity information, that is, M-byte. Modify the information M to indicate that in the next (the (j+1)th) GMP block container, the mapping granularity is changed to that specified by the information M'.

The size of the jth GMP block container remains unchanged. The original mapping granularity is still used, in the GMP block container j, to perform the mapping processing on the customer service data to be sent. The mapping granularity changing is completed in the (j+1)th GMP block container. The size of the (j+1)th GMP block container remains unchanged; that is, the size of the (j+1)th GMP block container is consistent with that of the jth GMP block container. The mapping granularity used by the (j+1)th GMP block container may be known according to the information M' in the GMP OH of the previous (the jth) GMP block container. The mapping granularity in the (j+1)th GMP block container is changed to a a value specified by the information M'.

S704. After the TS adjustment and the mapping granularity changing are completed, in the (j+1)th GMP block container, perform the mapping processing on the customer service data to be sent by using the changed mapping granularity. In a subsequent GMP block container, perform, according to the changed mapping granularity and the adjusted size of the block container, normal GMP mapping processing on the customer service data to be sent.

Figure 8:
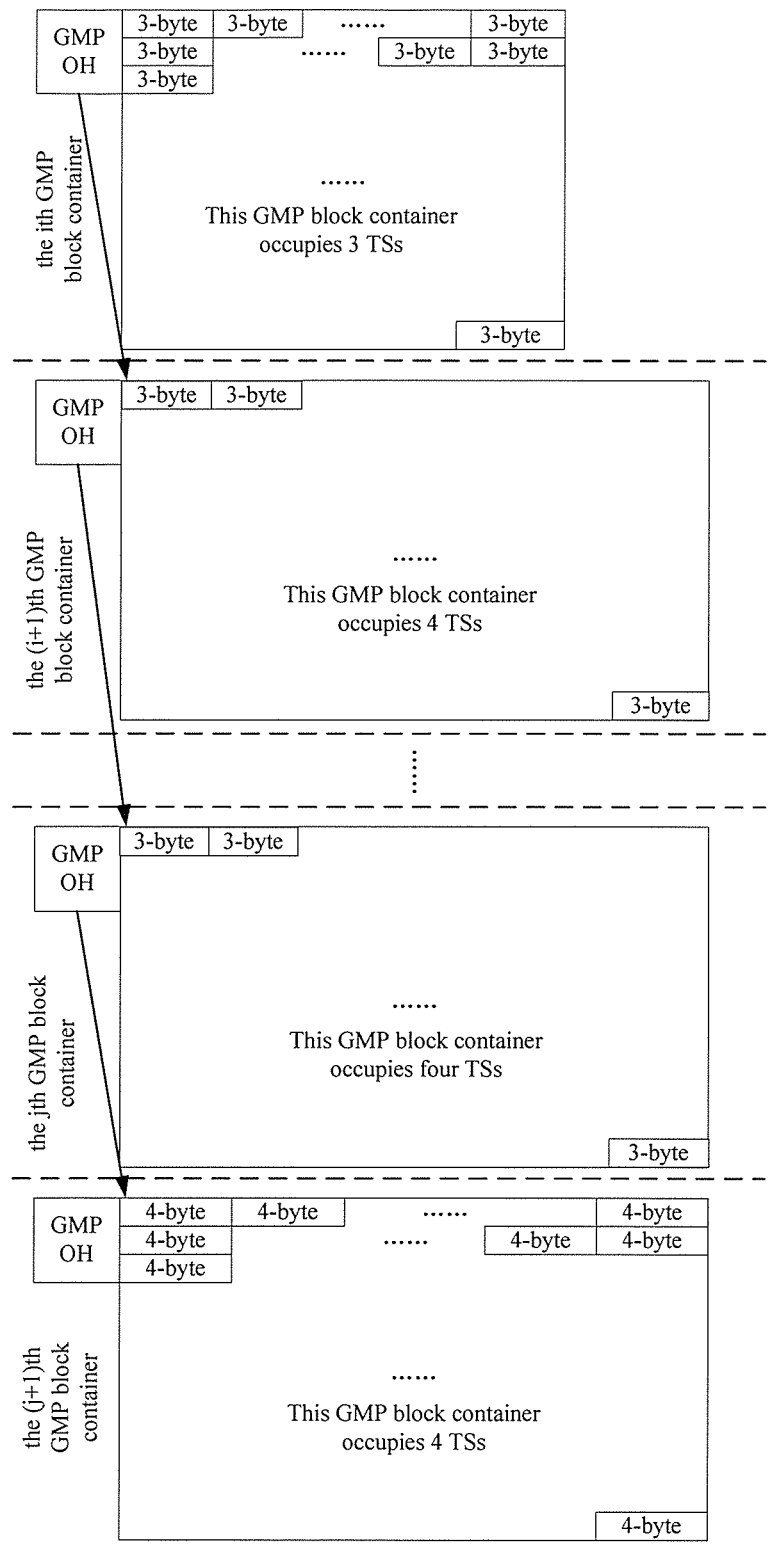
FIG. 8 is an example diagram of performing GMP mapping based on the method in FIG. 7 according to Embodiment 1 of the present invention.

FIG. 8 is an example diagram of performing GMP mapping based on the method in FIG. 7 according to Embodiment 1 of the present invention. As shown in FIG. 8, the ith GMP block container occupies three TSs and customer service data is mapped into the GMP block container in a 3-byte granularity; the size of the (i+1)th GMP block container is adjusted to four TSs and the customer service data is still mapped into the GMP block container in the 3-byte granularity; the size of the jth GMP block container still occupies four TSs and the customer service data is still mapped into the GMP block container in the 3-byte granularity; the size of the (j+1)th GMP block container still occupies four TSs and the mapping granularity is adjusted to 4-byte, that is, the customer service data is mapped into the GMP block container in a 4-byte granularity.

Figure 9:
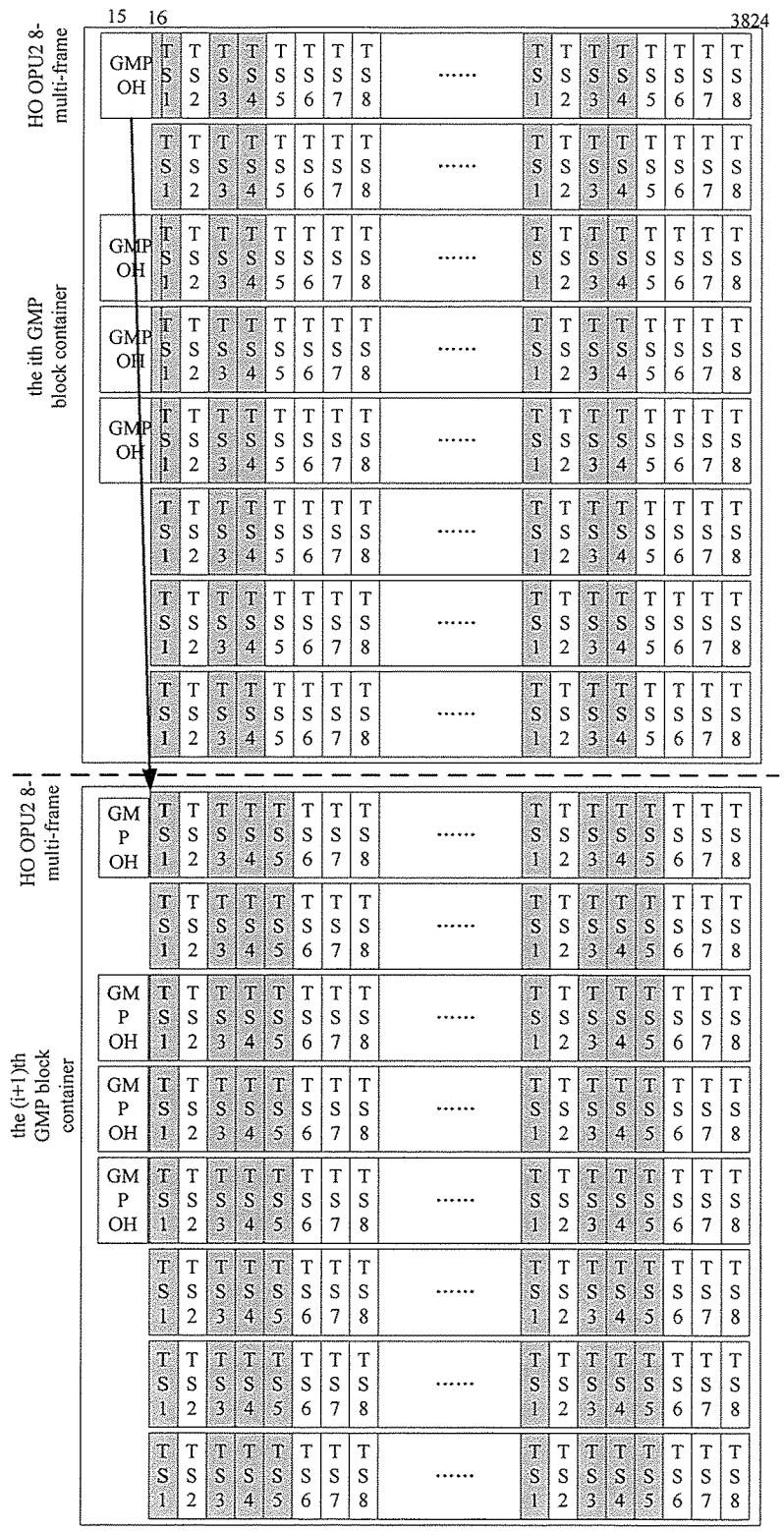
FIG. 9 is a schematic diagram of a TS adjustment and a mapping granularity change according to Embodiment 1 of the present invention.

FIG. 9 is a schematic diagram of a TS adjustment and a mapping granularity change according to Embodiment 1 of the present invention. Information M or information M' in FIG. 9 is placed in the first GMP overhead position of each GMP block container. As shown in FIG. 9, assume that an ODUflex is transmitted over an HO ODU2. The ODUflex occupies 3 TSs (TS1, TS3, and TS4, where a TS rate level is 1.25 Gbit/s) of the HO ODU2. After the ODUflex is mapped to an HO ODTU2.3 through a GMP, the ODUflex is multiplexed to the HO ODU2 through the HO ODTU2.3. Due to an increase of the ODUflex rate, four TSs (TS1, TS3, TS4, and TS5) of the HO ODU2 need to be occupied. In this case, to use the GMP processing method in this embodiment of the present invention, operations are performed based on the following mode (a mode in which a GMP block container and a mapping granularity are changed simultaneously):

1. Complete a condition indication of an HO ODU2 TS occupied by the ODUflex through a PSI [0-255] of a 256-multiframe of the HO ODU2, where PSI [2], PSI [4], PSI [5], and PSI [6] indicate that the current ODUflex needs to occupy TS1, TS3, TS4, and TS5.

2. After the TS condition indication is completed, trigger the TS switchover and the mapping granularity changing by changing the information M in the GMP OH.

2.1 Change the information M in a GMP OH of the ith GMP block container, where the information M is changed from 3TS to 4TS.

The size of the ith GMP block container remains HO ODTU2.3.

The 3-byte mapping granularity is still used in the ith GMP block container to perform the mapping processing on the ODUflex.

The value i is a positive integer and may be flexibly controlled according to an adjustment requirement after the TS condition indication is completed.

2.2 Complete the TS switchover and the mapping granularity changing in the (i+1)th GMP block container.

Adjust the current GMP block container to HO ODTU2.4 according to the information M in the GMP OH of the previous (the ith) GMP block container.

Meanwhile, perform the mapping processing on the ODUflex in the (i+1)th GMP block container using a 4-byte mapping granularity.

3. After the TS adjustment and the mapping granularity changing are completed, the GMP performs normal mapping processing in block container HO ODTU2.4 based on the 4-byte mapping granularity.

In the prior art, when the TS adjustment needs to be performed, the transmit end is capable of completing the condition indication of the HO ODU TS occupied by the ODUflex only by sending the PSI [0-255] of the 256-multiframe to the receive end, and cannot enable the receive end to perceive when the transmit end performs the TS switchover operation. Due to different HO ODUk rate levels, a phenomenon that boundaries of the GMP block container and boundaries of a 256-multiframe period are not aligned exists (for example, in ODU3, the GMP block container occupies a 32-multiframe TS of ODU3; in ODU4, the GMP block container occupies an 80-multiframe TS of ODU4; 80 and 256 does not have a multiple relationship, and therefore, the phenomenon that the boundaries of the GMP block container and the boundaries of the 256-multiframe period are not aligned may exist), which results in data damage during the TS switchover.

In conclusion, a GMP in the prior art is capable of performing the mapping processing for only a fixed container and cannot perform valid processing for a case of a variable container. With the adjustment of GMP block container, to avoid data damage, the GMP needs to have an adaptive capability during the container adjustment. The GMP in the prior art, however, cannot perform adaptive processing for a variable container. As a result, the objective of lossless data cannot be achieved.

According to the method in Embodiment 1 of the present invention, the generic mapping procedure overhead GMP OH carries the information about the time slot TS that needs to be occupied by the GMP block container and an adjustment of the size of the next GMP block obtainer is triggered through a change of the TS information. In this manner, lossless TS switchover during the TS adjustment is implemented. The mapping granularity that is associated with the information about the occupied TS is used to perform the mapping processing. Therefore, the mapping granularity used by the next GMP block container may be changed accordingly by modifying the TS information added in the GMP OH; or, the GMP block container and the mapping granularity may be changed separately by modifying the TS information and mapping granularity information added in the GMP OH respectively. This method enhances adaptation of the GMP and is capable of achieving lossless mapping and demapping processing for a variable container and a variable mapping granularity.

Embodiment 2

Embodiment 2 of the present invention provides a method for generic mapping procedure GMP demapping. The method is a processing method on a receive end.

Figure 10:
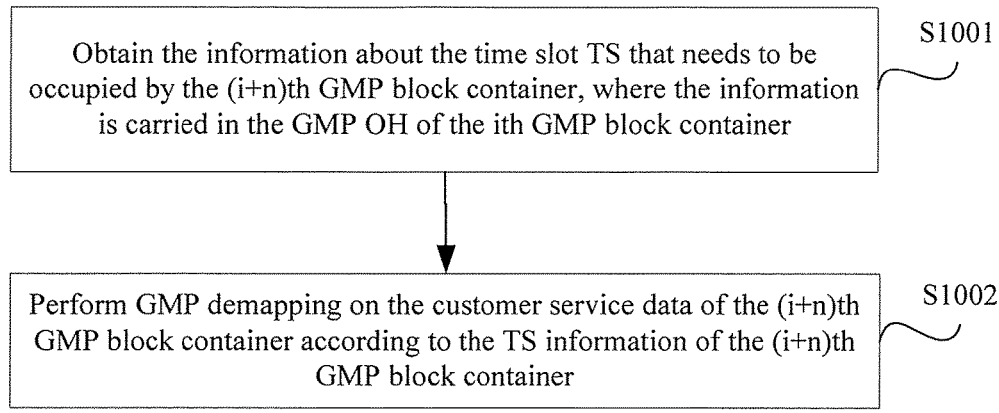
FIG. 10 is a flow chart of a general method according to Embodiment 2 of the present invention.

FIG. 10 is a flow chart of a general method according to Embodiment 2 of the present invention. As shown in FIG. 10, the method includes:

S1001. Obtain information about a TS that needs to be occupied by the (i+n)th GMP block container, where the information is carried in an overhead GMP OH of the ith GMP block container.

S1002. Perform GMP demapping on customer service data of the (i+n)th GMP block container according to the TS information of the (i+n)th GMP block container.

A processing object of the demapping is the customer service data. That is, the customer service data is demapped from the GMP block container.

In an optional implementation manner, the TS information includes TS quantity, where the TS quantity and a mapping granularity are associated and the GMP block container and the mapping granularity are changed simultaneously, which corresponds to this optional implementation manner.

The preceding method specifically includes: obtaining the quantity of TSs that need to be occupied by the (i+n)th GMP block container, where the information is carried in the overhead GMP OH of the ith GMP block container; and performing the GMP demapping on the customer service data of the (i+n)th GMP block container according to TS quantity of the (i+n)th GMP block container and a mapping granularity associated with the TS quantity.

In another optional implementation manner, the TS information includes the TS quantity and the mapping granularity, where the GMP block container and the mapping granularity are changed separately, which corresponds to this optional implementation manner.

The preceding method specifically includes: obtaining the quantity of the TSs that need to be occupied by the (i+n)th GMP block container, where the information is carried in the overhead GMP OH of the ith GMP block container; performing the GMP demapping on the customer service data of the (i+n)th GMP block container according to the TS quantity of the (i+n)th GMP block container and the mapping granularity of the ith GMP block container; obtaining a mapping granularity of the (j+m)th GMP block container, where the mapping granularity is carried in an overhead GMP OH of the jth GMP block container; and performing the GMP demapping on the customer service data of the (j+m)th GMP block container according to the TS quantity of the jth GMP block container and the mapping granularity of the (j+m)th GMP block container.

Figure 11:
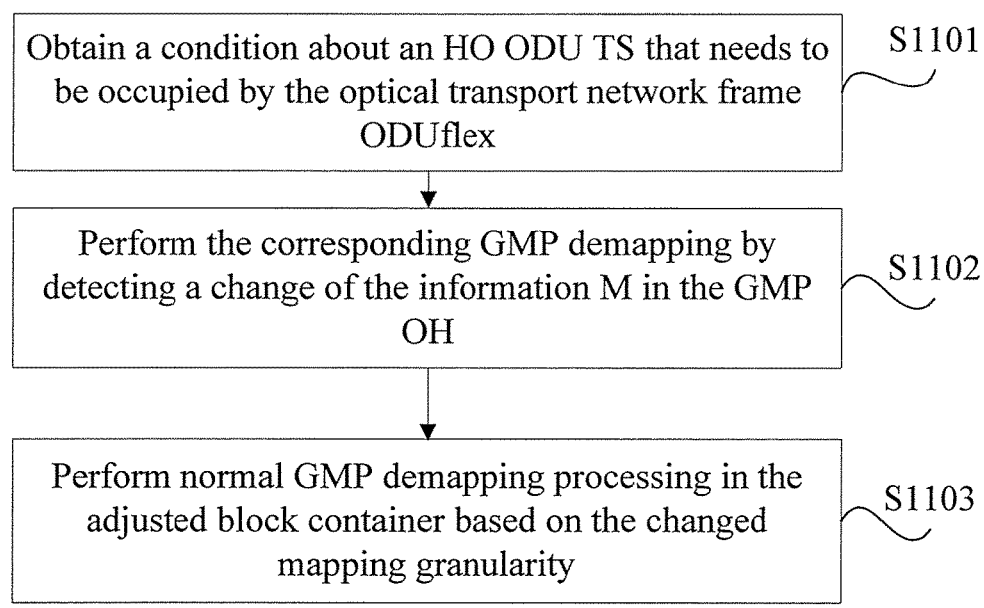
FIG. 11 is a first flow chart of a specific method according to Embodiment 2 of the present invention.

To facilitate description, the present embodiment takes n=1 as an example to describe a principle of the GMP demapping in detail. FIG. 11 is a first flow chart of a specific method according to Embodiment 2 of the present invention. The flowchart corresponds to a condition in which a GMP block container and a mapping granularity are changed simultaneously. As shown in FIG. 11, the method includes:

S1101. Obtain, based on a received PSI [0-255] indication of a 256-multiframe of an HO ODU, a condition about an HO ODU TS that needs to be occupied by an ODUflex.

S1102. After obtain the TS condition indication, perform corresponding GMP demapping processing by detecting a change of information M in a GMP OH.

Optionally, the process of S1102 specifically includes:

1) Detect the information M in the GMP OH of the GMP block container and perform corresponding processing.

When detecting that information M in a GMP OH of a (for example, the ith) GMP block container is changed, it is indicated that a TS adjustment is performed in the next (the (i+1)th) GMP block container, that is, the size of the GMP block container is adjusted and the mapping granularity is also changed accordingly, indicating that demapping processing needs to be performed in the next (the (i+1)th) GMP block container according to the mapping granularity and block container specified by the information M. If no change is detected, it is indicated that in the next (the (i+1)th) GMP block container, the GMP demapping processing is performed still according to the original mapping granularity and the original block container.

2) Perform demapping processing in the next GMP block container.

Perform the corresponding demapping processing according to an indication of the information M in the GMP OH of the previous (the ith) GMP block container. When the information M indicates that the TS is switched over, perform, according to the mapping granularity specified by the information M, the demapping processing in the GMP block container specified by the information M; that is, perform the demapping processing in the (i+1)th GMP block container according to the block container size specified by the information M and the mapping granularity specified by the information M; or that is, demap customer service data in the mapping granularity specified by the information M by performing the GMP demapping processing in the block container of the size specified by the information M. When the information M indicates that the TS is not switched over, perform the GMP demapping processing still in the original GMP block container according to the original mapping granularity.

S1103. After the TS adjustment and the mapping granularity changing are complete, perform normal GMP demapping processing in the adjusted block container according to the changed mapping granularity.

For an example diagram of performing the GMP demapping based on the method shown in FIG. 11 in Embodiment 2 of the present invention, see FIG. 6. As shown in FIG. 6, the ith GMP block container occupies three TSs and the customer service data is demapped from the GMP block container based on a 3-byte mapping granularity; the size of the (i+1)th GMP block container is adjusted to 4 TSs and the customer service data is demapped from the GMP block container based on a 4-byte mapping granularity.

Figure 12:
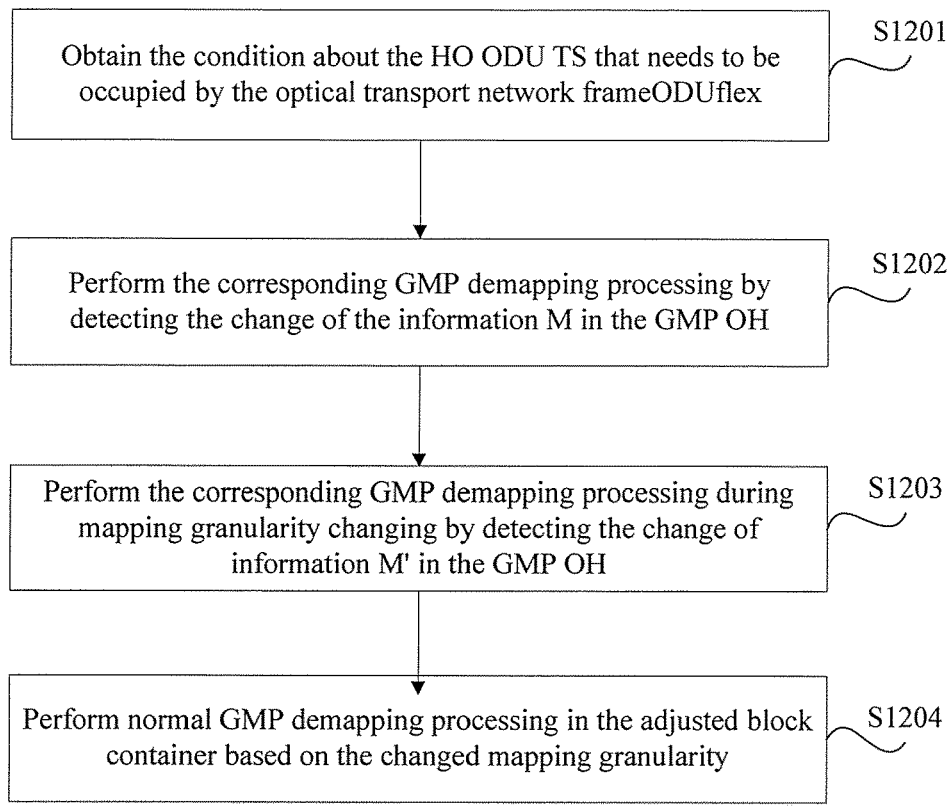
FIG. 12 is a second flow chart of a specific method according to Embodiment 2 of the present invention.

FIG. 12 is a second flow chart of a specific method according to Embodiment 2 of the present invention. This flow chart corresponds to a condition in which a GMP block container and a mapping granularity are changed separately. As shown in FIG. 12, the method includes:

S1201. Obtain, based on a received PSI [0-255] indication of a 256-multiframe of an HO ODU, a condition about an HO ODU TS that needs to be occupied by an ODUflex.

S1202: After obtaining the TS condition indication, perform corresponding GMP demapping processing during a condition adjustment by detecting a change of information M in a GMP OH.

Optionally, the specific process of S1202 includes:

1) Detect the information M in the GMP OH of the GMP block container and performing corresponding processing.

When detecting that information M in a GMP OH of the ith GMP block container is changed, it is indicated that a TS adjustment is performed in the next (the (i+1)th) GMP block container, that is, the size of the (i+1)th GMP block container is adjusted, indicating that the demapping processing needs to be performed in the next GMP block container according to a block container specified by the changed information M. If no change is detected, it is indicated that in the next GMP block container, the demapping processing is performed still according to the original block container. In the ith GMP block container, the demapping processing is performed still according to the original block container.

2) Perform the demapping processing in the next (the (i+1)th) GMP block container.

Perform the corresponding demapping processing according to an indication of the information M in the GMP OH of the previous (the ith) GMP block container. When it is indicated that the TS is switched over, perform the demapping processing in the (i+1)th GMP block container according to the block container size specified by the changed information M; when it is indicated that the TS is not switched over, perform the demapping processing in the (i+1)th GMP block container still according to the original block container size. The mapping granularity used when the demapping is performed in the (i+1)th GMP block container remains unchanged.

S1203. Perform corresponding GMP demapping during mapping granularity changing by detecting a change of information M' in the GMP OH.

Optionally, the specific process of S1203 may include:

1) Detect the information M' in the GMP OH of the GMP block container and performing the corresponding processing.

When information M' in a GMP OH of the jth GMP block container is changed, it is indicated that the mapping granularity is changed in the next (the (j+1)th) GMP block container and that the demapping processing needs to be performed in the next (the (j+1)th) GMP block container according to the mapping granularity specified by the information M'. When the information M' in the GMP OH of the jth GMP block container remains unchanged, it is indicated that in the next (the (j+1)th) GMP block container, the demapping processing is performed still according to the original mapping granularity. The value j is a positive integer.

2) Perform the demapping processing in the next (the (j+1)th) GMP block container.

Perform the corresponding demapping processing according to an indication of the information M' in the GMP OH of the previous (the jth) GMP block container. When it is indicated that the mapping granularity of the GMP is changed, perform the demapping processing in the (j+1)th GMP block container according to the mapping granularity specified by the information M'; when it is indicated that the mapping granularity of the GMP remains unchanged, perform the demapping processing in the (j+1)th GMP block container still according to the original mapping granularity, where the size of the (j+1)th GMP block container remains unchanged.

S1204: After the TS adjustment and the mapping granularity changing are completed, perform normal GMP demapping processing in the adjusted block container according to the changed mapping granularity.

For an example diagram of performing the GMP demapping based on the method shown in FIG. 12 in Embodiment 2 of the present invention, see FIG. 8. As shown in FIG. 8, the ith GMP block container occupies 3 TSs and the customer service data is demapped from the GMP block container based on a 3-byte granularity; the size of the (i+1)th GMP block container is adjusted to 4 TSs and the customer service data is demapped from the GMP block container still based on the 3-byte granularity; the jth GMP block container still occupies 4 TSs and the customer service data is demapped from the GMP block container still based on the 3-byte granularity; the (j+1)th GMP block container still occupies 4 TSs and the mapping granularity is adjusted to 4-byte, that is, the customer service data is demapped from the GMP block container based on a 4-byte granularity.

The following describes the technical solution in Embodiment 2 of the present invention by using a specific example:

1. Obtain an indication about TS1, TS3, TS4, and TS5 of HO ODU2 that need to be occupied by the ODUflex based on the received PSI[0-255] of the 256-multiframe of the HO ODU2.

2. After obtaining the TS condition indication, perform the corresponding GMP demapping processing by detecting a change of the information M in the GMP OH.

2.1. Detect that the information M in the GMP OH of the ith GMP block container is changed from 3TS to 4TS and trigger a response operation.

It is indicated that a TS adjustment is performed in the next (the (i+1)th) GMP block container, that is, the (i+1)th GMP block container is adjusted to HO ODTU2.4; meanwhile, the mapping granularity is changed to 4-byte.

The size of the ith GMP block container remains HO ODTU2.3.

In the ith GMP block container, the ODUflex is demapped still by using the 3-byte mapping granularity.

2.2. Perform demapping processing in the next (the (i+1)th) GMP block container.

According to the indication of information M in the GMP OH of the previous (the ith) GMP block container, perform the demapping processing in the adjusted GMP block container HO ODTU2.4 based on the changed mapping granularity 4-byte.

3. After the TS adjustment and the mapping granularity changing are completed, the GMP performs normal demapping processing in block container HO ODTU2.4 based on the 4-byte mapping granularity.

In the method in Embodiment 2 of the present invention, whether the information about the time slot TS occupied by the GMP block container is changed in the generic mapping procedure GMP OH is detected. When it is detected that the TS information or the mapping granularity information is changed, corresponding adjustments on the size of the GMP block container and the mapping granularity are triggered and the demapping processing is performed according to the block container size specified by the changed TS information. In this way, adaptive processing for a variable container and a variable mapping granularity is achieved and a lossless TS adjustment is implemented.

Embodiment 3

Embodiment 3 of the present invention provides an apparatus for generic mapping procedure GMP mapping. The apparatus is capable of implementing the mapping method in Embodiment 1.

Figure 13:
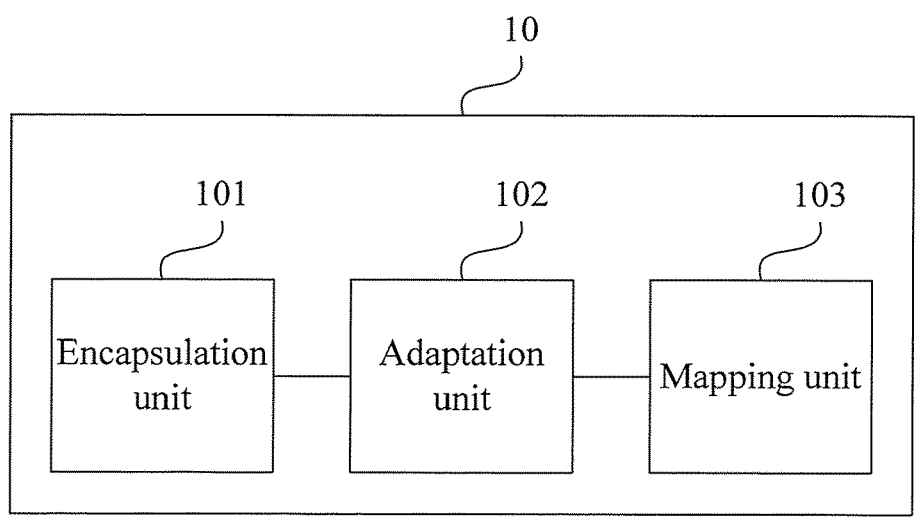
FIG. 13 is a general function block diagram of an apparatus for GMP mapping according to Embodiment 3 of the present invention.

FIG. 13 is a function block diagram of an apparatus for GMP mapping according to Embodiment 3 of the present invention. As shown in FIG. 13, the apparatus 10 includes:

an encapsulation unit 101, configured to carry, in an overhead GMP OH of the ith GMP block container, information about a TS that needs to be occupied by the (i+n)th GMP block container;

an adaptation unit 102, configured to adjust the (i+n)th GMP block container according to the information about the TS the needs to be occupied by the (i+n)th GMP block container; and a mapping unit 103, configured to perform, according to the adjusted (i+n)th GMP block container, the GMP mapping on customer service data to be sent.

1) Optionally, the TS information includes TS quantity. The TS quantity and a mapping granularity are associated.

For this condition, the encapsulation unit 101 may further be configured to carry, in the overhead GMP OH of the ith GMP block container, the TS quantity of the (i+n)th GMP block container, where the TS quantity needs to be adjusted; the adaptation unit 102 may further be configured to simultaneously adjust the size of the (i+n)th GMP block container and the mapping granularity according to the TS quantity; and the mapping unit 103 may further configured to perform, according to the adjusted size of the (i+n)th GMP block container and the adjusted mapping granularity, the GMP mapping on the customer service data to be sent.

2) Optionally, the TS information includes the TS quantity and the mapping granularity.

For this condition, the encapsulation unit 101 may further configured to carry, in the overhead GMP OH of the ith GMP block container, the TS quantity of the (i+n)th GMP block container that needs to be adjusted; the adaptation unit 102 may further be configured to adjust the size of the (i+n)th GMP block container according to the TS quantity; and the mapping unit 103 may further be configured to perform the GMP mapping on the customer service data to be sent according to the adjusted size of the (i+n)th GMP block container and the mapping granularity of the ith GMP block container.

Optionally, the encapsulation unit 101 may further be configured to carry, in the overhead GMP OH of the jth GMP block container, a mapping granularity of the (j+m)th GMP block container, where the mapping granularity needs to be adjusted; the adaptation unit 102 may further be configured to adjust the mapping granularity of the (j+m)th GMP block container according to the carried mapping granularity; and the mapping unit 103 may further be configured to perform, according to the size of jth GMP block container and the mapping granularity of the (j+m)th GMP block container, the GMP mapping on the customer service data to be sent.

Figure 14:
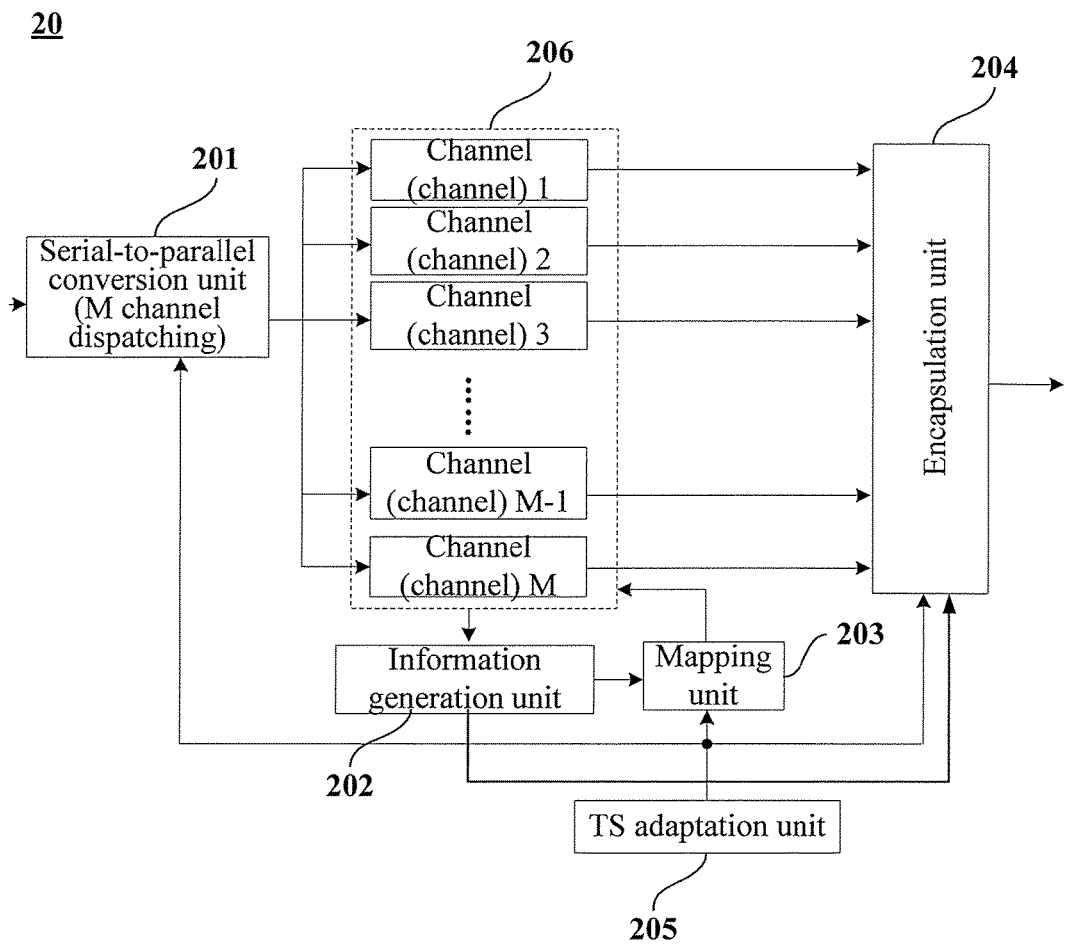
FIG. 14 is a detailed function block diagram of an apparatus for GMP mapping according to Embodiment 3 of the present invention.

FIG. 14 is a detailed function block diagram of the apparatus in Embodiment 3 of the present invention. As shown in FIG. 14, the apparatus 20 includes:

a serial-to-parallel conversion unit 201, configured to distribute serial data to M cache pipes based on a byte granularity, where M is the quantity of TSs of an HO ODU that are occupied by an ODUflex and is also a mapping granularity; when the mapping granularity is 3-byte, the serial-to-parallel conversion unit 201 writes three bytes of customer data into three cache pipes at a time in a parallel manner, that is, writes one byte of the customer data into each of the three cache pipes;

a channel unit (Channel 1-Channel M) 206, configured to serve as a cache pipe in the byte granularity;

an information generation unit 202, configured to generate data information C8M and clock information C8-delta during mapping, where C8M indicates the amount of data in an M-byte granularity, where the data is mapped into a GMP block container; and the clock information refers to a speed or mapping rate when the customer data is mapped into the GMP block container;

a mapping unit 203, configured to read data from the M cache pipes according to a particular mapping algorithm, where the mapping algorithm is, for example, a "sigma-delta" algorithm; for example, when the mapping granularity is 3, the customer data is read from 3 cache pipes in a unit of three bytes to an encapsulation unit;

the encapsulation unit 204, configured to encapsulate the data and an overhead into a frame; and a TS adaptation unit 205, configured to perform a triggering operation on a TS adjustment and mapping granularity changing during GMP mapping. When the TS adjustment is performed (assuming that the TS quantity is changed from M−1 to M), the serial-to-parallel conversion unit 201, the mapping unit 203, and the encapsulation unit 204 are triggered according to a particular sequence to perform corresponding processing. The specific processing method includes: The TS adaptation unit 205 calculates, based on the pipe data depth (the amount of data stored in the current cache pipe), the C8M value, and a GMP block period (the time for completing mapping processing on a GMP block container, also referring to a multiframe period), the time when the serial-to-parallel conversion unit is triggered to switch from distributing data to M−1 cache pipes to distributing data to M cache pipes. That is, after the switchover, the data written into the cache pipes is mapped into a GMP block of an adjusted container.

The following example describes a processing process when the TS and the M are switched over simultaneously.

Assume that the cache pipe data depth at a start time point of the GMP block container is D; the amount of customer data that is in an M−1 byte granularity and needs to be mapped into the current GMP block container is represented as C8(M−1)_cur, where C8(M−1)_cur is greater than or equal to D, and D is greater than 0; after C8(M−1)_cur-D records of data in the M−1 byte granularity are written into ingresses of M−1 cache pipes, the serial-to-parallel conversion unit 201 switches from distributing data to M−1 cache pipes to distributing data to M cache pipes, that is, switches to writing data in an M-byte granularity into ingresses of M cache pipes.

After reading C8(M−1)_cur records of data in the M−1 byte granularity in the M−1 cache pipes in the current GMP block period, the mapping unit 203 switches to reading data in the M-byte granularity in the M cache pipes in the next GMP block period. The switchover time point is a GMP block boundary. The encapsulation unit 204 multiplexes the GMP block container (HO ODTU.M) to the HO ODU at a boundary of an HO ODU multiframe. The information generation unit 202 is configured to input the generated data information and clock information into the encapsulation unit 204, where the data information and the clock information are included in the GMP OH. The encapsulation unit 204 is further configured to generate an ODU OH and an OTU OH. In this case, the encapsulation unit 204 may be configured to uses the ODU OH, the OTU OH, and the GMP OH as an overhead of an OTN frame, and encapsulate the frame overhead and valid customer data into a frame.

The apparatus in this embodiment performs the triggering operation on the time slot TS adjustment and the mapping granularity changing, which may enhance the GMP adaptation and achieve lossless mapping and demapping processing for a variable container and a variable mapping granularity.

Embodiment 4

Embodiment 4 of the present invention provides an apparatus for generic mapping procedure GMP demapping. The apparatus is capable of implementing the demapping method in Embodiment 2.

Figure 15:
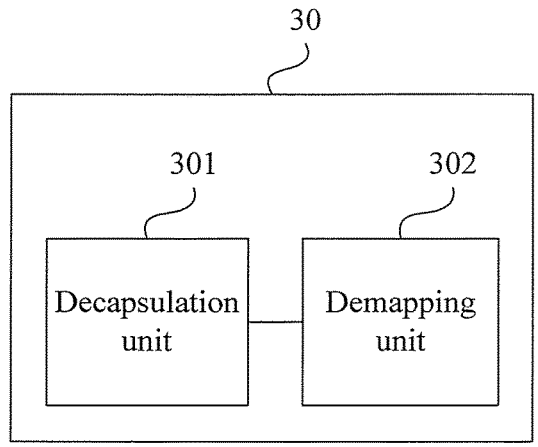
FIG. 15 is a general function block diagram of an apparatus for GMP demapping according to Embodiment 4 of the present invention.

FIG. 15 is a general function block diagram of the apparatus for GMP demapping in Embodiment 4 of the present invention. As shown in FIG. 15, the apparatus 30 includes:

a decapsulation unit 301, configured to obtain information about a time slot TS that needs to be occupied by the (i+n)th GMP block container in an overhead GMP OH of the ith GMP block container; and a demapping unit 302, configured to perform GMP demapping on customer service data of the (i+n)th GMP block container according to the TS information of the (i+n)th GMP block container.

Optionally, the TS information includes TS quantity, where the TS quantity is associated with a mapping granularity. The decapsulation unit 301 is configured to obtain the quantity of TSs that need to be occupied by the (i+n)th GMP block container, where the quantity of the TSs is carried in the overhead GMP OH of the ith GMP block container. The demapping unit 302 is configured to perform the GMP demapping on the customer service data of the (i+n)th GMP block container according to the TS quantity of the (i+n)th GMP block container and the mapping granularity associated with the TS quantity.

Optionally, the TS information includes the TS quantity and the mapping granularity. The decapsulation unit 301 may be configured to obtain the quantity of the TSs that need to be occupied by the (i+n)th GMP block container, where the quantity of the TSs is carried in the overhead GMP OH of the ith GMP block container. The demapping unit 302 may be configured to perform the GMP demapping on the customer service data of the (i+n)th GMP block container according to the TS quantity of the (i+n)th GMP block container and the mapping granularity of the ith GMP block container. The decapsulation unit 301 may further be configured to obtain a mapping granularity of the (j+m)th GMP block container, where the mapping granularity is carried in an overhead GMP OH of the jth GMP block container. The demapping unit 302 may further be configured to perform the GMP demapping on customer service data of the (j+m)th GMP block container according to the TS quantity of the jth GMP block container and the mapping granularity of the (j+m)th GMP block container.

Figure 16:
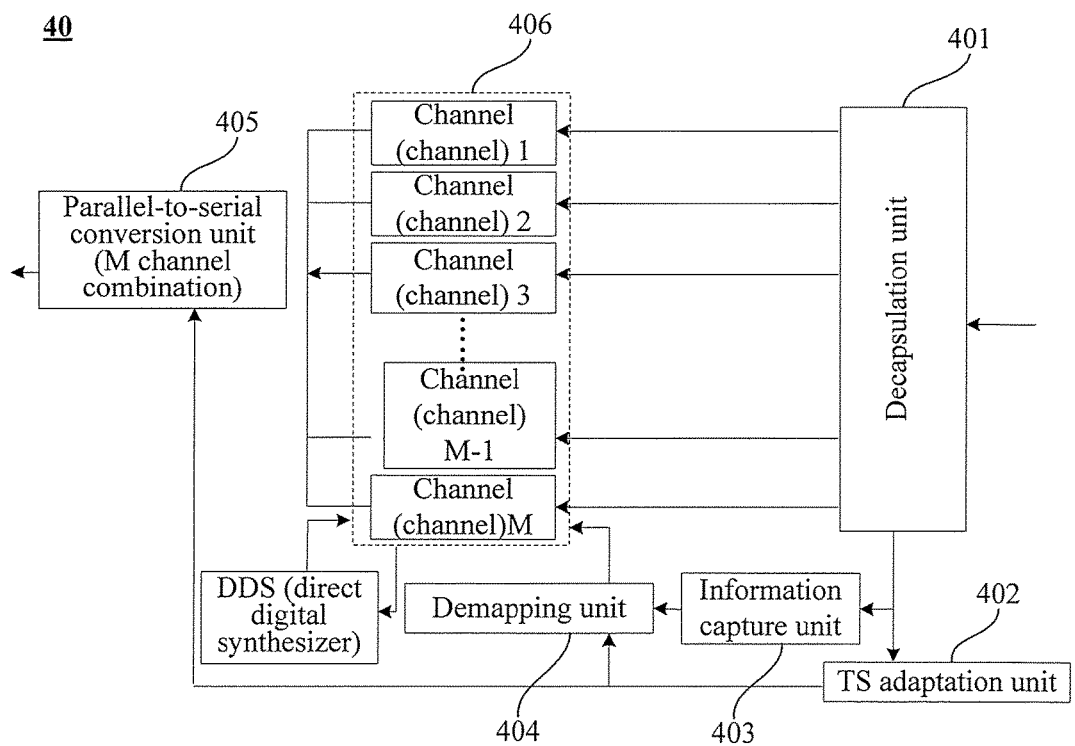
FIG. 16 is a detailed function block diagram of an apparatus for GMP demapping according to Embodiment 4 of the present invention.

FIG. 16 is a detailed specific function block diagram of the apparatus in Embodiment 4 of the present invention. As shown in FIG. 16, the apparatus 40 includes:

a decapsulation unit 401, configured to abstract an overhead from an optical transport network frame;

a TS adaptation unit 402, configured to obtain time slot TS change information and mapping granularity information during mapping from the overhead and perform a corresponding triggering operation;

an information capture unit 403, configured to obtain data information C8M and clock information C8-delta from the overhead;

a demapping unit 404, configured to demap customer service data carried in the optical transport network frame and write the data into a cache pipe 406 in a multiple-byte granularity; and a parallel-to-serial conversion unit 405, configured to combine payload data in the cache pipe 406 (Channel 1 to Channel M) in the multiple-byte granularity as a serial data flow.

A DDS (Direct Digital Synthesizer) is a direct digital frequency synthesizer, configured to recover a customer service clock.

The apparatus in this embodiment of the present invention obtains the time slot TS change information and the mapping granularity change information during the mapping from the overhead and performs the corresponding triggering operation, which provides a GMP adaptation processing method for a variable container and a variable mapping granularity and a triggering mechanism for lossless TS switchover. The apparatus enhances the GMP adaptation and achieves lossless mapping and demapping processing for the variable container and the variable mapping granularity.

Persons of ordinary skill in the art should understand that all or part of the processes in the methods of the preceding embodiments may be implemented by a program instructing relevant hardware. The program may be stored in a computer readable storage medium. When the program runs, the processes in the embodiments of each of the preceding methods may be performed. The storage medium may be a magnetic disk, a CD-ROM, a read-only memory (Read-Only Memory, ROM), a random access memory (Random Access Memory, RAM), and so on.

The preceding embodiments are merely provided for describing the technical solutions in the embodiments of the present invention, but not intended to limit the present invention. Persons of ordinary skill in the art should understand that modifications may be made on the technical solutions recorded in each of the preceding embodiments, or equivalent replacements may be made on a part of the technical features; and these modifications or replacements do not make the nature of the corresponding technical solutions depart from the spirit and scope of the technical solutions in each of the embodiments of the present invention.

What is claimed is:

1. A method for generic mapping procedure (GMP) mapping customer service data in an optical transport network (OTN), the method comprising:

carrying, in an optical channel payload unit (OPU) overhead (OH) of a first higher order (HO) OPU multiframe, a change indication of a number of time slots (TS) occupied by an ODUflex in a second HO OPU multiframe subsequent in time to the first HO OPU multiframe;

adjusting, in accordance with the change indication, the number of TSs of the second HO OPU multiframe that need to be occupied by the ODUflex to a value different than the quantity of TSs of the first HO OPU multiframe occupied by the ODUflex;

performing, GMP mapping on the ODUflex, in order to map the ODUflex into the adjusted quantity of one or more TSs of the second HO OPU multiframe; and transmitting the ODUflex, wherein the ODUflex carries customer service data.

2. The method according to claim 1, wherein the method further comprises:

mapping the ODUflex into an optical channel data tributary unit (ODTU); and mapping the ODTU into the second multiframe.

3. A method for generic mapping procedure (GMP) demapping customer service data in an optical transport network (OTN), the method comprising:

receiving an ODUflex, wherein the ODUflex carries customer service data;

obtaining from an optical channel payload unit (OPU) overhead (OH) of a first higher order (HO) OPU multiframe, a change indication of a number of time slots (TS) occupied by the ODUflex in a second HO OPU multiframe subsequent in time to the first HO OPU multiframe; and performing GMP demapping on the second HO OPU multiframe to obtain the ODUflex according to the change indication;

wherein the GMP demapping according to the change indication comprises accounting for the number of TSs of the second HO OPU multiframe that are occupied by the ODUflex being different than the quantity of TSs of the first HO OPU multiframe occupied by the ODUflex.

4. An apparatus for generic mapping procedure (GMP) mapping in an optical transport network (OTN), the apparatus comprising:

a processor and a computer readable medium having a plurality of computer executable instructions stored thereon which, when executed by the processor, cause the processor to:

carry, in an optical channel payload unit (OPU) overhead (OH) of a first higher order (HO) OPU multiframe, a change indication of a number of time slots (TS) occupied by an ODUflex in a second HO OPU multiframe subsequent in time to the first HO OPU multiframe;

adjust, in accordance with the change indication, the number of TSs of the second HO OPU multiframe that need to be occupied by the ODUflex to a value different than the quantity of TSs of the first HO OPU multiframe occupied by the ODUflex;

perform, GMP mapping on the ODUflex, in order to map the ODUflex into the adjusted quantity of one or more TSs of the second HO OPU multiframe; and transmit the ODUflex, wherein the ODUflex carries customer service data.

5. The apparatus according to claim 4, wherein the computer executable instructions comprise instructions which, when executed by the processor, cause the processor to:

map the ODUflex into an optical channel data tributary unit (ODTU); and map the ODTU into the second multiframe.

6. An apparatus for generic mapping procedure (GMP) demapping customer service data in an optical transport network (OTN), the method comprising:

- a processor and computer readable medium having a plurality of computer executable instructions stored thereon which, when executed by the processor, cause the processor to:
- receive an ODUflex, wherein the ODUflex carries customer service data;
- obtain from an optical channel payload unit (OPU) overhead (OH) of a first higher order (HO) OPU multiframe, a change indication of a number of time slots (TS) occupied by the ODUflex in a second HO OPU multiframe subsequent in time to the first HO OPU multiframe; and
- perform GMP demapping on the second HO OPU multiframe to obtain the ODUflex according to the change indication;
- wherein the GMP demapping according to the change indication comprises accounting for the number of TSs of the second HO OPU multiframe that are occupied by the ODUflex being different than the quantity of TSs of the first HO OPU multiframe occupied by the ODUflex.

* * * * *